US012298109B2

(12) United States Patent
Smith et al.

(10) Patent No.: US 12,298,109 B2
(45) Date of Patent: May 13, 2025

(54) WARNING SYSTEM FOR A CONDUCTED ELECTRICAL WEAPON

(71) Applicant: Axon Enterprise, Inc., Scottsdale, AZ (US)

(72) Inventors: Patrick W. Smith, Scottsdale, AZ (US); Michael E. Gish, Phoenix, AZ (US); Magne Nerheim, Paradise Valley, AZ (US); Hans Moritz, Scottsdale, AZ (US); Brian Fairbanks, Scottsdale, AZ (US); Milan Cerovic, Scottsdale, AZ (US); Mark Eastwood, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 28 days.

(21) Appl. No.: 18/130,309

(22) Filed: Apr. 3, 2023

(65) Prior Publication Data

US 2023/0251065 A1 Aug. 10, 2023

Related U.S. Application Data

(63) Continuation of application No. 17/150,913, filed on Jan. 15, 2021, now Pat. No. 11,619,471.
(Continued)

(51) Int. Cl.
*G08B 1/00* (2006.01)
*F41H 13/00* (2006.01)
(Continued)

(52) U.S. Cl.
CPC ........... *F41H 13/0025* (2013.01); *G08B 3/10* (2013.01); *G08B 5/36* (2013.01); *G08B 7/06* (2013.01)

(58) Field of Classification Search
CPC ............. F41H 13/0025; F41H 13/0087; F41H 13/0012; G08B 3/10; G08B 5/36; G08B 7/06
(Continued)

(56) References Cited

U.S. PATENT DOCUMENTS 4,884,809 A 12/1989 Rowan
7,631,452 B1 12/2009 Brundula et al.
(Continued)

FOREIGN PATENT DOCUMENTS

TW M538140 U 3/2017
TW M586792 U 11/2019
WO 2011056732 A1 5/2011

OTHER PUBLICATIONS

IP Australia, Examination Report No. 1 for Australian Application No. 2021207400 mailed Sep. 8, 2023.
(Continued)

*Primary Examiner* — Tai T Nguyen
(74) *Attorney, Agent, or Firm* — Justin Powley

(57) ABSTRACT

A warning system for a conducted electrical weapon ("CEW") may be configured to alert a target that deployment of the CEW may be imminent. The warning system may include a visual output system and an audio output system. The visual output system may be configured to output a visual warning. The audio output system may be configured to output an audio warning. The visual output system and the audio output system may be activated in response to a control interface of the CEW being operated to an active mode. The visual output system and the audio output system may be deactivated, or not activated, in response to the control interface being operated to a safety mode.

20 Claims, 5 Drawing Sheets

Related U.S. Application Data

(60) Provisional application No. 62/962,714, filed on Jan. 17, 2020.

(51) Int. Cl.
*G08B 3/10* (2006.01)
*G08B 5/36* (2006.01)
*G08B 7/06* (2006.01)

(58) Field of Classification Search
USPC .......................................................... 340/531
See application file for complete search history.

(56) References Cited

U.S. PATENT DOCUMENTS

| | | | | |
|---|---|---|---|---|
| 9,025,304 | B2 | 5/2015 | Brundula et al. | |
| 9,816,789 | B1 | 11/2017 | Hyde et al. | |
| 10,024,636 | B2 | 7/2018 | Nerheim | |
| 10,473,438 | B2 | 11/2019 | Nerheim et al. | |
| 11,156,438 | B2 | 10/2021 | Yang | |
| 2011/0025491 | A1* | 2/2011 | Cazanas | F41A 19/01 340/539.1 |
| 2012/0118990 | A1 | 5/2012 | Beever, III | |
| 2013/0140283 | A1 | 6/2013 | Bradley et al. | |
| 2013/0208392 | A1 | 8/2013 | Brundula et al. | |
| 2014/0098453 | A1* | 4/2014 | Brundula | F41H 5/24 361/232 |
| 2016/0040965 | A1 | 2/2016 | Chang | |
| 2016/0165192 | A1* | 6/2016 | Saatchi | H04N 7/185 386/227 |
| 2017/0245355 | A1 | 8/2017 | Handel et al. | |
| 2017/0286654 | A1* | 10/2017 | Nicoll | F41A 17/08 |
| 2018/0023910 | A1* | 1/2018 | Kramer | H04N 5/772 386/227 |
| 2018/0045492 | A1 | 2/2018 | Heroor et al. | |
| 2018/0051964 | A1 | 2/2018 | Forsythe et al. | |
| 2020/0109926 | A1 | 4/2020 | Mata | |
| 2021/0364256 | A1 | 11/2021 | Pirc et al. | |

OTHER PUBLICATIONS

Korean Intellectual Property Office, International Search Report for International Application No. PCT/IB2021/050313, Apr. 15, 2021, p. 1-6.
Taiwan IPO, Office Action for Taiwan Application No. 110101654 mailed Jun. 2, 2022.
Taiwan Patent Office, Allowance Decision of Re-Examination for Taiwanese Application No. 110101654 mailed Sep. 27, 2023.
European Patent Office, Extended European Search Report for European Application No. 21741048.9 mailed Dec. 20, 2023.
New Zealand Intellectual Property Office, Patent Examination Report 1 for New Zealand Application No. 791312 mailed Feb. 26, 2024.
Australian Patent Office, Notice of Acceptance for Australian Application No. 2021207400 mailed Jul. 23, 2024.

* cited by examiner

WARNING SYSTEM FOR A CONDUCTED ELECTRICAL WEAPON

FIELD OF THE INVENTION

Embodiments of the present disclosure relate to a conducted electrical weapon ("CEW").

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
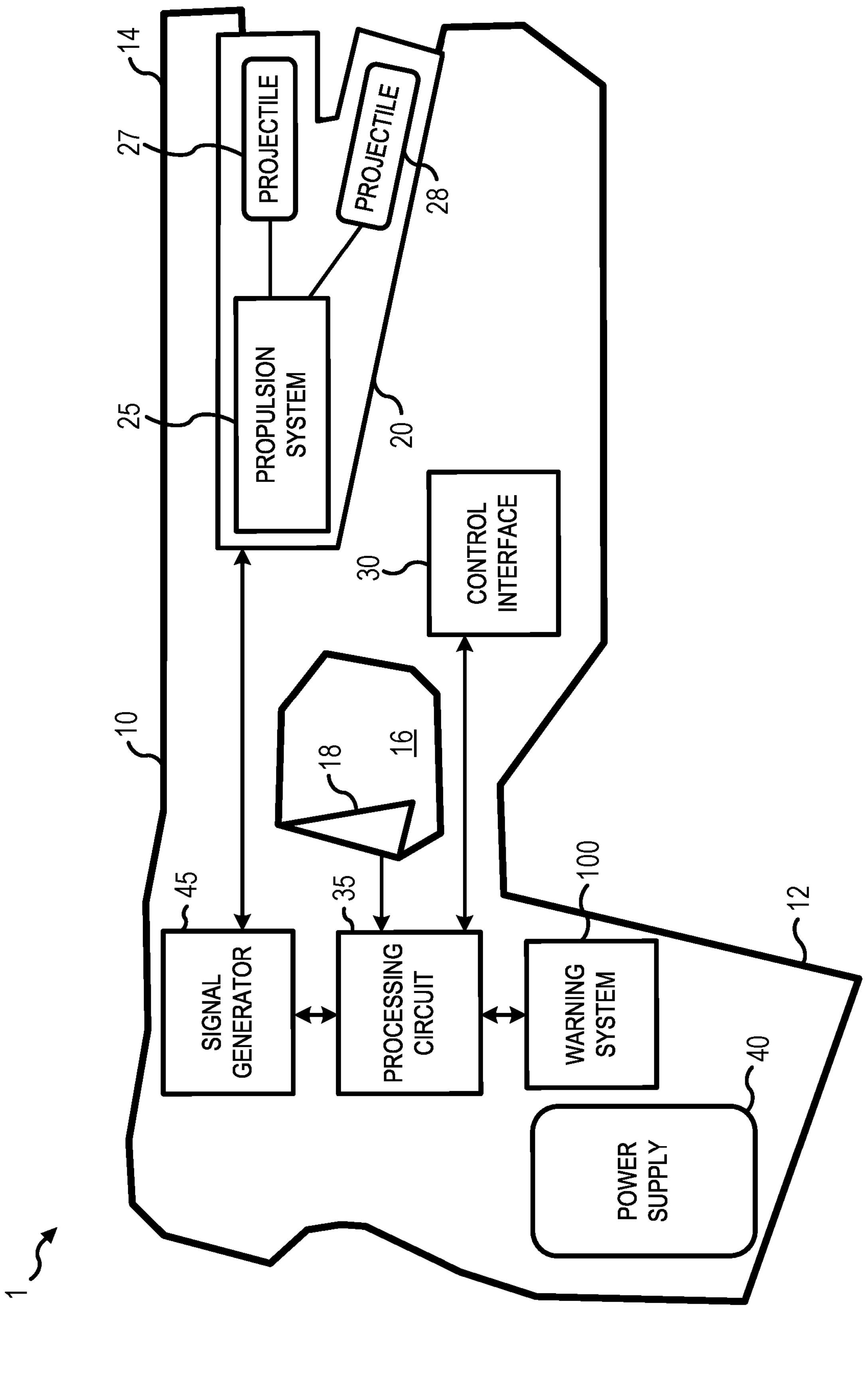
FIG. 1 illustrates a schematic diagram of a conducted electrical weapon, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a CEW may be used to deliver a current (e.g., stimulus signal, pulses of current, pulses of charge, etc.) through tissue of a human or animal target. Although typically referred to as a conducted electrical weapon, as described herein a "CEW" may refer to a conducted electrical weapon, a conducted energy weapon, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a deployment unit (e.g., cartridge). The terminals are spaced apart from each other. In response to the electrodes of the deployment unit in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and one or more deployment units. The handle may include one or more bays for receiving the deployment units. Each deployment unit may be removably positioned in (e.g., inserted into, coupled to, etc.) a bay. Each deployment unit may releasably electrically, electronically, and/or mechanically couple to a bay. A deployment of the CEW may launch one or more electrodes toward a target to remotely deliver the stimulus signal through the target.

In various embodiments, a deployment unit may include two or more electrodes that are launched at the same time. In various embodiments, a deployment unit may include two or more electrodes that may be launched individually at separate times. Launching the electrodes may be referred to as activating (e.g., firing) a deployment unit. After use (e.g., activation, firing), a deployment unit may be removed from the bay and replaced with an unused (e.g., not fired, not activated) deployment unit to permit launch of additional electrodes.

In various embodiments, and with reference to FIG. 1, a CEW 1 is disclosed. CEW 1 may be similar to, or have similar aspects and/or components with, any CEW discussed herein. CEW 1 may comprise a housing 10 and one or more deployment units 20 (e.g., cartridges). It should be understood by one skilled in the art that FIG. 1 is a schematic representation of CEW 1, and one or more of the components of CEW 1 may be located in any suitable position within, or external to, housing 10.

Housing 10 may be configured to house various components of CEW 1 that are configured to enable deployment of the deployment units 20, provide an electrical current to the deployment units 20, and otherwise aid in the operation of CEW 1, as discussed further herein. Although depicted as a firearm in FIG. 1, housing 10 may comprise any suitable shape and/or size. Housing 10 may comprise a handle end 12 opposite a deployment end 14. Deployment end 14 may be configured, and sized and shaped, to receive one or more deployment units 20. Handle end 12 may be sized and shaped to be held in a hand of a user. For example, handle end 12 may be shaped as a handle to enable hand-operation of the CEW by the user. In various embodiments, handle end 12 may also comprise contours shaped to fit the hand of a user, for example, an ergonomic grip. Handle end 12 may include a surface coating, such as, for example, a non-slip surface, a grip pad, a rubber texture, and/or the like. As a further example, handle end 12 may be wrapped in leather, a colored print, and/or any other suitable material, as desired.

In various embodiments, housing 10 may comprise various mechanical, electronic, and/or electrical components configured to aid in performing the functions of CEW 1. For example, housing 10 may comprise one or more triggers 18, control interfaces 30, processing circuits 35, power supplies 40, and/or signal generators 45. Housing 10 may include a guard 16. Guard 16 may define an opening formed in housing 10. Guard 16 may be located on a center region of housing 10 (e.g., as depicted in FIG. 1), and/or in any other suitable location on housing 10. Trigger 18 may be disposed within guard 16. Guard 16 may be configured to protect trigger 18 from unintentional physical contact (e.g., an unintentional activation of trigger 18). Guard 16 may surround trigger 18 within housing 10.

In various embodiments, trigger 18 may be coupled to an outer surface of housing 10, and may be configured to move, slide, rotate, or otherwise become physically depressed or moved upon application of physical contact. For example, trigger 18 may be actuated by physical contact applied to trigger 18 from within guard 16. Trigger 18 may comprise a mechanical or electromechanical switch, button, trigger, or the like. For example, trigger 18 may comprise a switch, a pushbutton, and/or any other suitable type of trigger. Trigger 18 may be mechanically and/or electronically coupled to processing circuit 35. In response to trigger 18 being activated (e.g., depressed, pushed, etc. by the user), processing circuit 35 may enable deployment of one or more deployment units 20 from CEW 1, as discussed further herein.

In various embodiments, power supply 40 may be configured to provide power to various components of CEW 1. For example, power supply 40 may provide energy for operating the electronic and/or electrical components (e.g., parts, subsystems, circuits, etc.) of CEW 1 and/or one or more deployment units 20. Power supply 40 may provide electrical power. Providing electrical power may include providing a current at a voltage. Power supply 40 may be electrically coupled to processing circuit 35 and/or signal generator 45. In various embodiments, in response to control interface 30 comprising electronic properties and/or components, power supply 40 may be electrically coupled to control interface 30. In various embodiments, in response to trigger 18 comprising electronic properties or components, power supply 40 may be electrically coupled to trigger 18. Power supply 40 may provide an electrical current at a voltage. Electrical power from power supply 40 may be provided as a direct current ("DC"). Electrical power from power supply 40 may be provided as an alternating current ("AC"). Power supply 40 may include a battery. The energy of power supply 40 may be renewable, exhaustible, and/or replaceable. For example, power supply 40 may comprise one or more rechargeable or disposable batteries. In various embodiments, the energy from power supply 40 may be converted from one form (e.g., electrical, magnetic, thermal) to another form to perform the functions of a system.

Power supply 40 may provide energy for performing the functions of CEW 1. For example, power supply 40 may provide the electrical current to signal generator 45 that is provided through a target to impede locomotion of the target (e.g., via deployment unit 20). Power supply 40 may provide the energy for a stimulus signal. Power supply 40 may provide the energy for other signals, including an ignition signal and/or an integration signal, as discussed further herein.

In various embodiments, processing circuit 35 may comprise any circuitry, electrical components, electronic components, software, and/or the like configured to perform various operations and functions discussed herein. For example, processing circuit 35 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processing circuit 35 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processing circuit 35 may include data buses, output ports, input ports, timers, memory, arithmetic units, and/or the like.

Processing circuit 35 may be configured to provide and/or receive electrical signals whether digital and/or analog in form. Processing circuit 35 may provide and/or receive digital information via a data bus using any protocol. Processing circuit 35 may receive information, manipulate the received information, and provide the manipulated information. Processing circuit 35 may store information and retrieve stored information. Information received, stored, and/or manipulated by processing circuit 35 may be used to perform a function, control a function, and/or to perform an operation or execute a stored program.

Processing circuit 35 may control the operation and/or function of other circuits and/or components of CEW 1. Processing circuit 35 may receive status information regarding the operation of other components, perform calculations with respect to the status information, and provide commands (e.g., instructions) to one or more other components. Processing circuit 35 may command another component to start operation, continue operation, alter operation, suspend operation, cease operation, or the like. Commands and/or status may be communicated between processing circuit 35 and other circuits and/or components via any type of bus (e.g., SPI bus) including any type of data/address bus.

In various embodiments, processing circuit 35 may be mechanically and/or electronically coupled to trigger 18. Processing circuit 35 may be configured to detect an activation, actuation, depression, input, etc. (collectively, an "activation event") of trigger 18. In response to detecting the activation event, processing circuit 35 may be configured to perform various operations and/or functions, as discussed further herein. Processing circuit 35 may also include a sensor (e.g., a trigger sensor) attached to trigger 18 and configured to detect an activation event of trigger 18. The sensor may comprise any suitable mechanical and/or electronic sensor capable of detecting an activation event in trigger 18 and reporting the activation event to processing circuit 35.

In various embodiments, processing circuit 35 may be mechanically and/or electronically coupled to control interface 30 and/or a warning system 100. Processing circuit 35 may be configured to detect an activation, actuation, depression, input, etc. (collectively, a "control event") of control interface 30. In response to detecting the control event, processing circuit 35 may be configured to perform various operations and/or functions, as discussed further herein. Processing circuit 35 may also include a sensor (e.g., a control sensor) attached to control interface 30 and configured to detect a control event of control interface 30. The sensor may comprise any suitable mechanical and/or electronic sensor capable of detecting a control event in control interface 30 and reporting the control event to processing circuit 35.

In various embodiments, processing circuit 35 may be electrically and/or electronically coupled to power supply 40. Processing circuit 35 may receive power from power supply 40. The power received from power supply 40 may be used by processing circuit 35 to receive signals, process signals, and transmit signals to various other components in CEW 1. Processing circuit 35 may use power from power supply 40 to detect an activation event of trigger 18, a control event of control interface 30, or the like, and generate one or more control signals in response to the detected events. The control signal may be based on the control event and the activation event. The control signal may be an electrical signal.

In various embodiments, processing circuit 35 may be electrically and/or electronically coupled to signal generator 45. Processing circuit 35 may be configured to transmit or provide control signals to signal generator 45 in response to detecting an activation event of trigger 18. Multiple control signals may be provided from microprocessor 35 to signal generator 45 in series. In response to receiving the control signal, signal generator 45 may be configured to perform various functions and/or operations, as discussed further herein.

In various embodiments, signal generator 45 may be configured to receive one or more control signals from processing circuit 35. Signal generator 45 may provide an ignition signal to deployment unit 20 based on the control signals. Signal generator 45 may be electrically and/or electronically coupled to processing circuit 35 and/or deployment unit 20. Signal generator 45 may be electrically coupled to power supply 40. Signal generator 45 may use power received from power supply 40 to generate an ignition signal. For example, signal generator 45 may receive an electrical signal from power supply 40 that has first current and voltage values. Signal generator 45 may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. Signal generator 45 may temporarily store power from power supply 40 and rely on the stored power entirely or in part to provide the ignition signal. Signal generator 45 may also rely on received power from power supply 40 entirely or in part to provide the ignition signal, without needing to temporarily store power.

Signal generator 45 may be controlled entirely or in part by processing circuit 35. In various embodiments, signal generator 45 and processing circuit 35 may be separate components (e.g., physically distinct and/or logically discrete). Signal generator 45 and processing circuit 35 may be a single component. For example, a control circuit within housing 10 may at least include signal generator 45 and processing circuit 35. The control circuit may also include other components and/or arrangements, including those that further integrate corresponding function of these elements into a single component or circuit, as well as those that further separate certain functions into separate components or circuits.

Signal generator 45 may be controlled by the control signals to generate an ignition signal having a predetermined current value or values. For example, signal generator 45 may include a current source. The control signal may be received by signal generator 45 to activate the current source at a current value of the current source. An additional control signal may be received to decrease a current of the current source. For example, signal generator 45 may include a pulse width modification circuit coupled between a current source and an output of the control circuit. A second control signal may be received by signal generator 45 to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators 45 may alternatively or additionally be employed, including those that apply a voltage over one or more different resistances to generate signals with different currents. In various embodiments, signal generator 45 may include a high-voltage module configured to deliver an electrical current having a high voltage. In various embodiments, signal generator 45 may include a low-voltage module configured to deliver an electrical current having a lower voltage, such as, for example, 2,000 volts.

Responsive to receipt of a signal indicating activation of trigger 18 (e.g., an activation event), a control circuit provides an ignition signal to deployment unit 20. For example, signal generator 45 may provide an electrical signal as an ignition signal to deployment unit 20 in response to receiving a control signal from processing circuit 35. In various embodiments, the ignition signal may be separate and distinct from a stimulus signal. For example, a stimulus signal in CEW 1 may be provided to a different circuit within deployment unit 20, relative to a circuit to which an ignition signal is provided. Signal generator 45 may be configured to generate a stimulus signal. In various embodiments, a second, separate signal generator, component, or circuit (not shown) within housing 10 may be configured to generate the stimulus signal. Signal generator 45 may also provide a ground signal path for deployment unit 20, thereby completing a circuit for an electrical signal provided to deployment unit 20 by signal generator 45. The ground signal path may also be provided to deployment unit 20 by other elements in housing 10, including power supply 40.

In various embodiments, a deployment unit 20 may comprise a propulsion system 25 and a plurality of projectiles, such as, for example, a first projectile 27 and a second projectile 28. Deployment unit 20 may comprise any suitable or desired number of projectiles, such as, for example two projectiles, three projectiles, nine projectiles, ten projectiles, twelve projectiles, eighteen projectiles, and/or any other desired number of projectiles. Further, housing 10 may be configured to receive any suitable or desired number of deployment units 20, such as, for example, one deployment unit, two deployment units, three deployment units, etc.

In various embodiments, propulsion system 25 may be coupled to, or in communication with (directly or indirectly), each projectile in deployment unit 20. In various embodiments, deployment unit 20 may comprise a plurality of propulsion systems 25, with each propulsion system 25 coupled to, or in communication with, one or more projectiles. Propulsion system 25 may comprise any device, propellant (e.g., air, gas, etc.), primer, chemical explosive (e.g., gunpowder, smokeless powder, black powder, etc.) or the like capable of providing a propulsion force in deployment unit 20. The propulsion force may include an increase in pressure caused by rapidly expanding gas within an area or chamber. The propulsion force may be applied to projectiles 27, 28 in deployment unit 20 to cause the deployment of projectiles 27, 28. Propulsion system 25 may provide the propulsion force in response to deployment unit 20 receiving the ignition signal.

In various embodiments, the propulsion force may be directly applied to one or more projectiles 27, 28. For example, the propulsion force may be provided directly to first projectile 27 or second projectile 28. Propulsion system 25 may be in fluid communication with projectiles 27, 28 to provide the propulsion force. For example, the propulsion force from propulsion system 25 may travel within a housing or channel of deployment unit 20 to one or more projectiles 27, 28. The propulsion force may travel via a manifold in deployment unit 20.

In various embodiments, the propulsion force may be provided indirectly to first projectile 27 and/or second projectile 28. For example, the propulsion force may be provided to a secondary source of propellant within propulsion system 25. The propulsion force may launch the secondary source of propellant within propulsion system 25, causing the secondary source of propellant to release propellent. A force associated with the released propellant may in turn provide a force to one or more projectiles 27, 28. A force generated by a secondary source of propellent may cause projectiles 27, 28 to be deployed from the deployment unit 20 and CEW 1.

In various embodiments, each projectile 27, 28 may comprise any suitable type of projectile. For example, one or more projectiles 27, 28 may be or include an electrode (e.g., an electrode dart). An electrode may include a spear portion, designed to pierce or attach proximate a tissue of a target in order to provide a conductive electrical path between the electrode and the tissue, as previously discussed herein. For example, projectiles 27, 28 may each include a respective electrode. Projectiles 27, 28 may be deployed from deployment unit 20 at the same time or substantially the same time. Projectiles 27, 28 may be launched by a same propulsion force from a common propulsion system 25. Projectiles 27, 28 may also be launched by one or more propulsion forces received from one or more propulsion systems 25. Deployment unit 20 may include an internal manifold configured to transfer a propulsion force from propulsion system 25 to one or more projectiles 27, 28.

Control interface 30 may comprise, or be similar to, any control interface disclosed herein. In various embodiments, control interface 30 may be configured to control selection of firing modes in CEW 1. Controlling selection of firing modes in CEW 1 may include disabling firing of CEW 1 (e.g., a safety mode, etc.), enabling firing of CEW 1 (e.g., an armed mode, an active mode, a firing mode, an escalation mode, etc.), controlling deployment of deployment units 20, and/or similar operations, as discussed further herein. In various embodiments, control interface 30 may also be configured to control activation of warning system 100. For example, in response to control interface 30 being in an active mode, control interface 30 may activate warning system 100. In response to control interface 30 being in a safety mode, control interface 30 may deactivate, or not activate, warning system 100. In various embodiments, control interface 30 may also be operable into any other suitable or desired mode, such as, for example, an animal deterrent mode.

Control interface 30 may be located in any suitable location on or in housing 10. For example, control interface 30 may be coupled to an outer surface of housing 10. Control interface 30 may be coupled to an outer surface of housing 10 proximate trigger 18 and/or guard 16. Control interface 30 may be electrically, mechanically, and/or electronically coupled to processing circuit 35 and/or warning system 100. In various embodiments, in response to control interface 30 comprising electronic properties or components, control interface 30 may be electrically coupled to power supply 40. Control interface 30 may receive power (e.g., electrical current) from power supply 40 to power the electronic properties or components.

Control interface 30 may be electronically or mechanically coupled to trigger 18. For example, and as discussed further herein, control interface 30 may function as a safety mechanism. In response to control interface 30 being set to a "safety mode," CEW 1 may be unable to launch projectiles 27, 28 from deployment unit 20. For example, control interface 30 may provide a signal (e.g., a control signal) to processing circuit 35 instructing processing circuit 35 to disable deployment of deployment units 20. As a further example, control interface 30 may electronically or mechanically prohibit trigger 18 from activating (e.g., prevent or disable a user from depressing trigger 18; prevent trigger 18 from launching a projectile 27, 28; etc.).

Control interface 30 may comprise any suitable electronic or mechanical component capable of enabling selection of firing modes and/or activation of warning system 100. For example, control interface 30 may comprise a fire mode selector switch, a safety switch, a safety catch, a rotating switch, a selection switch, a selective firing mechanism, and/or any other suitable mechanical control switch (e.g., as depicted with safety switch 330 in FIGS. 3A and 3B, or safety switch 530 in FIGS. 5A and 5B). As a further example, control interface 30 may comprise a slide, such as a handgun slide, a reciprocating slide, or the like (e.g., as depicted with safety slide 430 in FIGS. 4A and 4B). As a further example, control interface 30 may comprise a touch screen or similar electronic component.

Figure 3A:
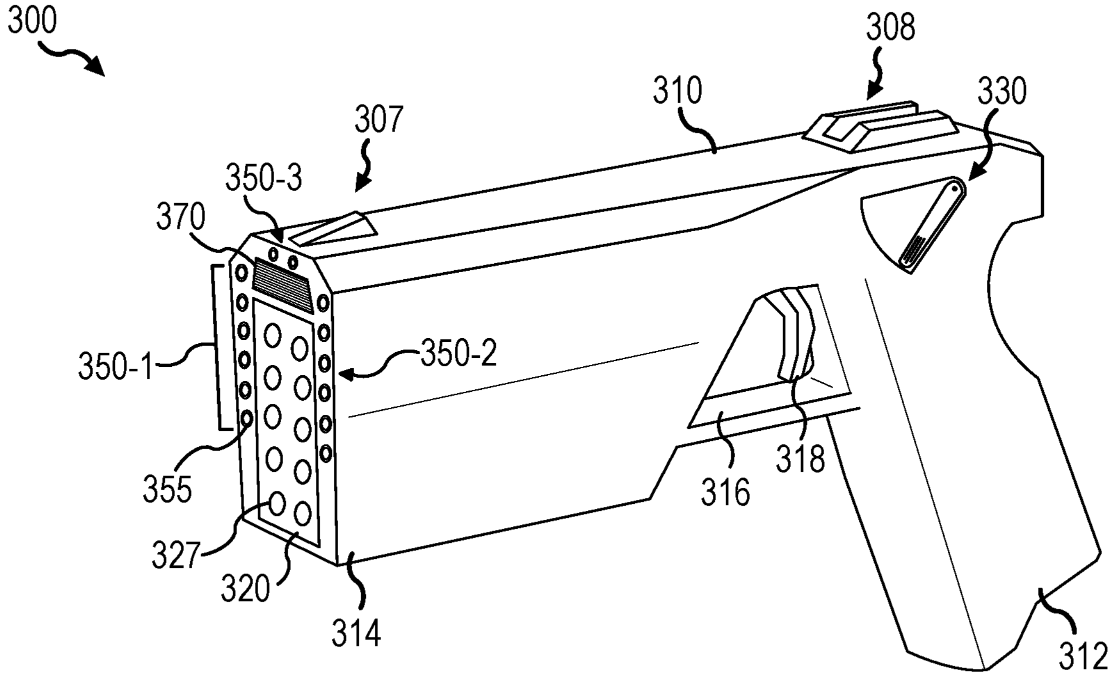
FIGS. 3A and 3B illustrate perspective views of a conducted electrical weapon comprising a safety member configured to control a warning system, in accordance with various embodiments.
Figure 3B:
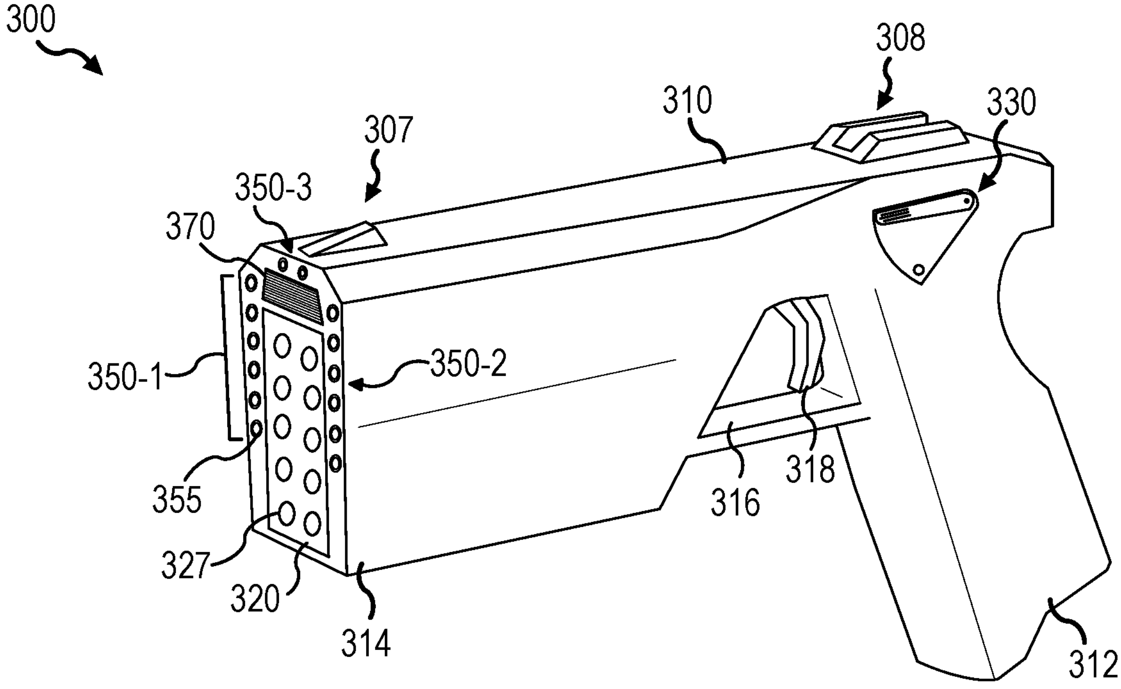
Figure 4A:
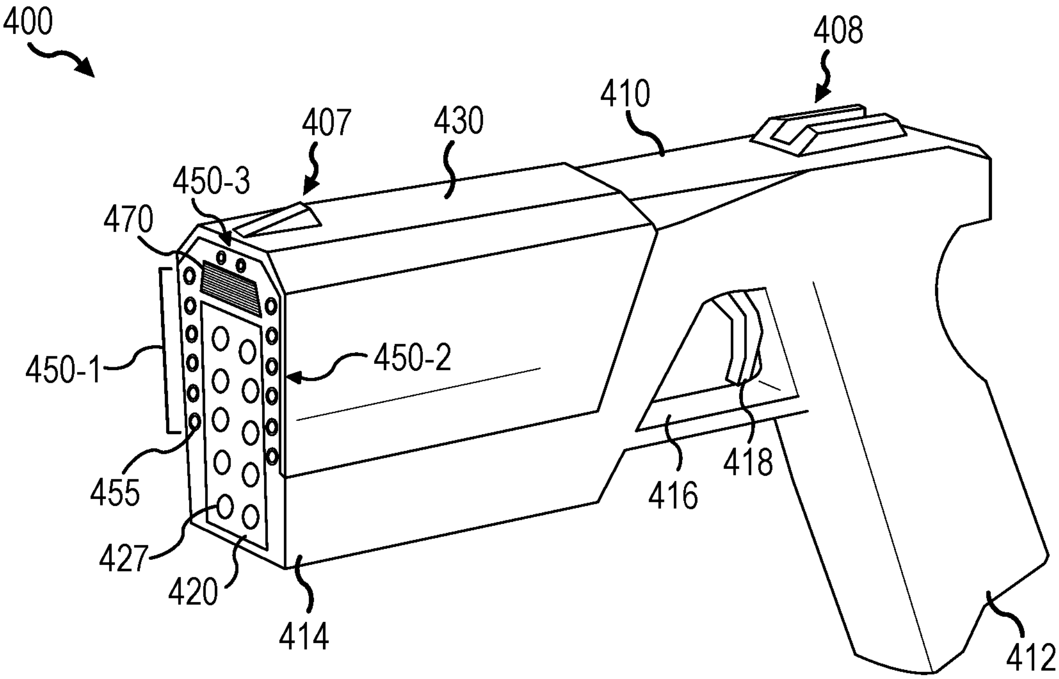
FIGS. 4A and 4B illustrate perspective views of a conducted electrical weapon comprising a slide member configured to control a warning system, in accordance with various embodiments.
Figure 4B:
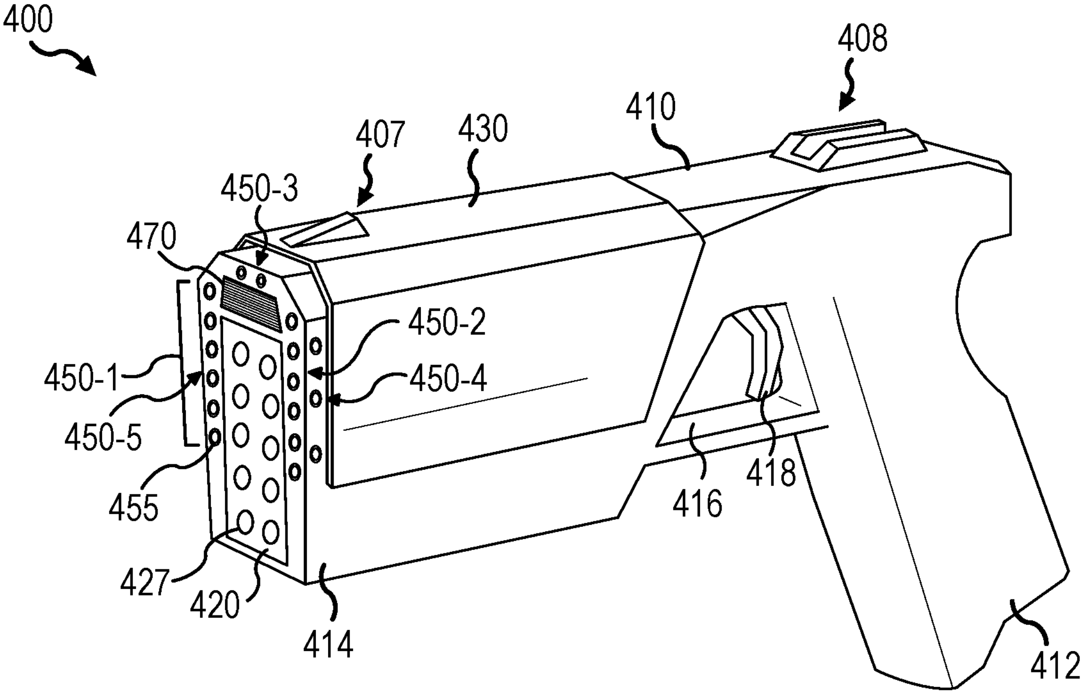
Figure 5A:
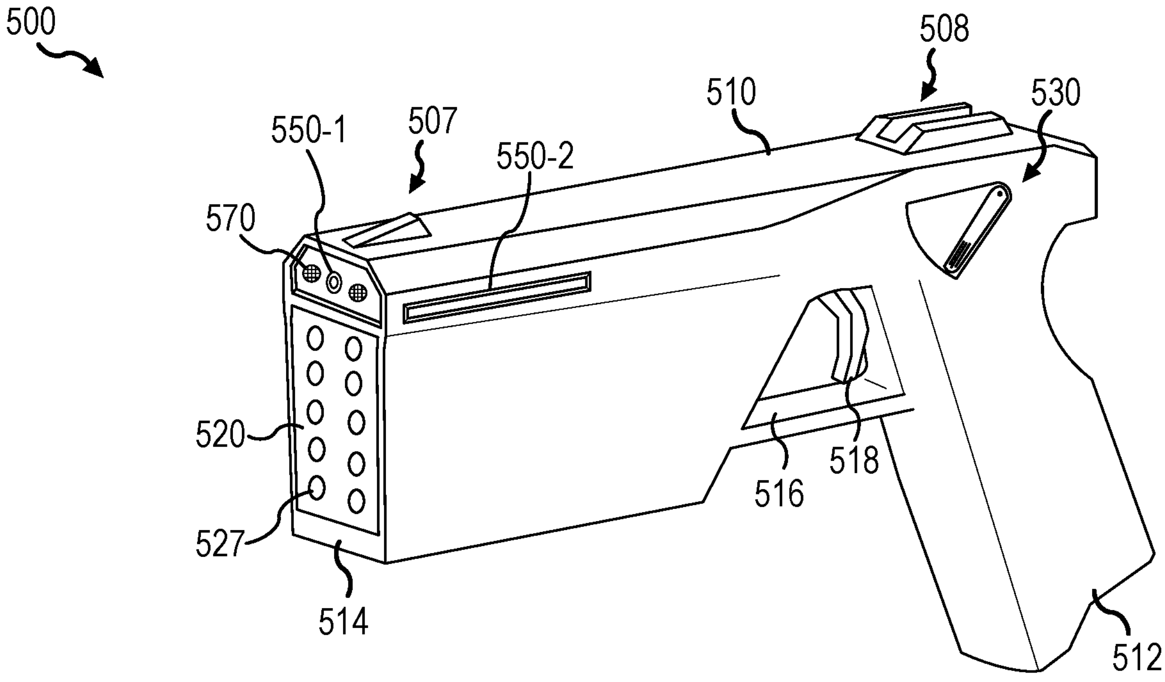
FIGS. 5A and 5B illustrate perspective views of a conducted electrical weapon comprising a safety member configured to control a warning system, in accordance with various embodiments.
Figure 5B:
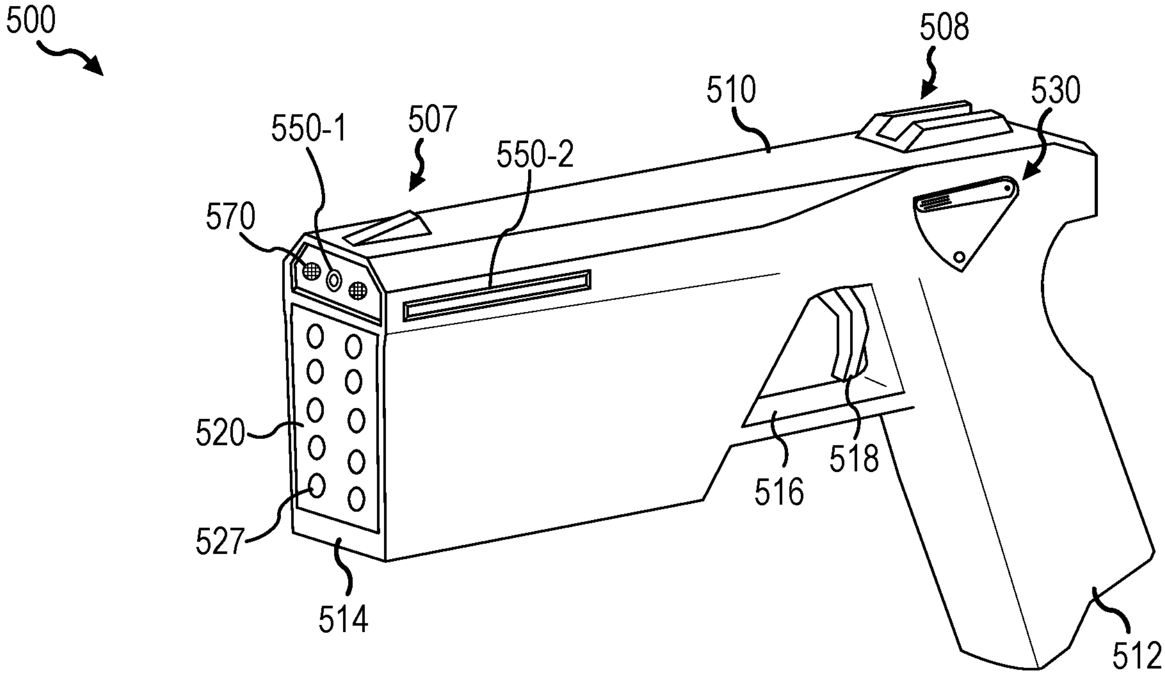

In various embodiments, a control interface (e.g., control interface 30, control interface 330 with brief reference to FIGS. 3A and 3B, control interface 430 with brief reference to FIGS. 4A and 4B, control interface 530 with brief reference to FIGS. 5A and 5B etc.) may enable selection of a safety mode and a firing mode. As described herein a "firing mode" may also be referred to as an "escalation mode," an "armed mode," an "active mode," or any other similar words and phrases, symbols, or the like used to impart similar functionalities. In response to a user operating the control interface (e.g., to select the safety mode or the firing mode), the control interface may transmit instructions to a processing circuit based on the operation.

The safety mode may be configured to prohibit deployment of an electrode from a deployment unit in a CEW. For example, in response to a user selecting the safety mode, the control interface may transmit a safety mode instruction to the processing circuit. In response to receiving the safety mode instruction, the processing circuit may prohibit deployment of an electrode from the deployment unit. The processing circuit may prohibit deployment until a further instruction is received from the control interface (e.g., a firing mode instruction). As previously discussed, the control interface may also, or alternatively, interact with a trigger of a CEW to prevent activation of the trigger. In various embodiments, the safety mode may also be configured to prohibit deployment of a stimulus signal from a signal generator of a CEW, such as, for example, a local delivery.

The firing mode may be configured to enable deployment of one or more electrodes from a deployment unit in a CEW. For example, and in accordance with various embodiments, in response to a user selecting the firing mode, the control interface may transmit a firing mode instruction to the processing circuit. In response to receiving the firing mode instruction, the processing circuit may enable deployment of an electrode from the deployment unit. In that regard, in response to the trigger being activated, the processing circuit may cause the deployment of one or more electrodes. The processing circuit may enable deployment until a further instruction is received from the control interface (e.g., a safety mode instruction). As a further example, and in accordance with various embodiments, in response to a user selecting the firing mode, the control interface may also mechanically (or electronically) interact with a trigger of the CEW to enable activation of the trigger.

The control interface may also be configured to activate and/or deactivate a warning system of a CEW. For example, in response to the control interface being operated to the firing mode, the control interface may activate the warning system. In response to the control interface being operated to the safety mode, the control interface may deactivate the warning system. The control interface may activate and/or deactivate the warning system using any suitable process.

For example, and as previously discussed, the control interface may transmit a firing mode instruction or a safety mode instruction to a processing circuit in response to the control interface being operated to a firing mode or a safety mode, respectively. In response to receiving the firing mode instruction, the processing circuit may activate the warning system. In response to receiving the safety mode instruction, the processing circuit may deactivate the warning system. In various embodiments, the processing circuit may contain logic, or logic may be supplied by a similar processor or firmware of the warning system, configured to selectively control activation of the warning system.

As a further example, the control interface (and/or the processing circuit) may be in electrical communication with an electrical switch, or similar component, located in an electrical circuit between the warning system and a power supply providing power to the warning system. In response to receiving the firing mode instruction, the control interface may control the electrical switch to provide power to the warning system (e.g., to activate the warning system). In response to receiving the safety mode instruction, the control interface may control the electrical switch to stop providing power to the warning system (e.g., to deactivate the warning system).

In various embodiments, warning system 100 may be in electronic communication with processing circuit 35. Warning system 100 may also be in electrical and/or electronic communication with power supply 40. Warning system 100 may comprise a standalone component in CEW 1, either partially or wholly, or may be at least partially or wholly integrated into another component of CEW 1, such as processing circuit 35.

Warning system 100 may be configured to output a warning in response to CEW 1 (e.g., control interface 30) being operated into a firing mode. In various embodiments, the warning may function to encourage a target to stop moving and/or to comply with requests from the user deploying CEW 1 (e.g., a law enforcement officer). For example, the warning may be configured to provide notice to the target that CEW 1 is in a firing mode, is no longer in a safety mode, and that deployment of CEW 1 may be imminent.

Warning system 100 may comprise one or more hardware and/or software components configured to generate and output the warning. The warning may include an audio output and/or a visual output. Warning system 100 may comprise hardware and/or software components configured to generate and output an audio output and/or a visual output. For example, in accordance with various embodiments and with reference to FIG. 2, an exemplary warning system 100 may comprise a visual output system 250 and/or an audio output system 270. As discussed herein, visual output system 250 and audio output system 270 may comprise separate components and/or systems or may at least partially or wholly include the same components and/or systems. For example, visual output system 250 and audio output system 270 may comprise separate processing circuits and/or logic, the same processing circuits and/or logic, and/or may rely on processing circuit 35 to provide processing power and/or logic.

In that regard, and in accordance with various embodiments, processing circuit 35 may be configured to control and/or coordinate operation of some or all aspects of visual output system 250 and/or audio output system 270. Processing circuit 35 may include (or be in communication with) memory configured to store data, programs, and/or instructions. The memory may comprise a tangible non-transitory computer-readable memory. Instructions stored on the tangible non-transitory memory may allow processing circuit 35 to perform various operations, functions, and/or steps, as described herein. For example, in response to processing circuit 35 executing the instructions on the tangible non-transitory memory, processing circuit 35 may communicate with visual output system 250 and/or audio output system 270 to output a warning (e.g., a visual output and/or an audio output, respectively). In various embodiments, processing circuit 35 may execute the instructions in response to operation of control interface 30 (e.g., operation to a firing mode or a safety mode).

Visual output system 250 may be configured to generate and/or output a visual output (e.g., a visual warning, a visual output warning, etc.). For example, the visual output may comprise an emitted light. Visual output system 250 may comprise one or more components configured to emit light such as, for example, one or more light emitting components, flashlights, laser modules, light emitting diodes (LED), and/or the like. The components may be arranged in any suitable manner, and may comprise individual light emitting components (e.g., an individual light, etc.), collective light emitting components (e.g., a light bar, a light strip, etc.), and/or a combination thereof.

Visual output system 250 may be configured to emit the light from (or through) an exterior surface of the CEW. For example, visual output system 250 may be configured to emit the light from a deployment end of the CEW (e.g., deployment end 14, with brief reference to FIG. 1), proximate a deployment end of the CEW, or from any other surface of the CEW. In that regard, visual output system 250 may be located proximate a deployment end of the CEW (e.g., as depicted in FIGS. 3A-4B). Visual output system 250 may be configured to emit light (at least partially) collinear with a deployment end of the CEW. Visual output system 250 may also be configured to emit light at an angle relative to a deployment end of the CEW. As a further example, a light emitting component of visual output system 250 may be located at any other exterior surface position on a CEW whereby a potential target may perceive the visual output.

In various embodiments, the light emitted by visual output system 250 may comprise one or more colored lights. For example, visual output system 250 may comprise an LED configured to emit a colored light. As a further example, one or more of the light emitting components of visual output system 250 may comprise a color filter configured to filter the emitted light into a desired color. The colored light may be configured to warn a target of a potential deployment of the CEW. In that regard, the colored light may comprise a color typically associated with warning signals such as red or yellow.

In various embodiments, visual output system 250 may emit the light based on a light emitting characteristic (e.g., a visual output characteristic). The light emitting characteristic may define characteristics of one or more of the light emitting components of visual output system 250. For example, a light emitting characteristic may define an emitting angle (e.g., an angle the light is emitted at, relative to placement of the light emitting component on the CEW). A light emitting characteristic may define an emitting color (e.g., for light emitting components capable of emitting lights in more than one color). A light emitting characteristic may define an emitting time (e.g., a visual output time, a visual emitting time, etc.). The emitting time may define a period of time that one or more light emitting components in visual output system 250 emit light (e.g., 5 seconds, 10 seconds, 20 seconds, 30 second, 1 minute, etc.). In various embodiments, the emitting time may be defined by the period of time control interface 30 is in an active mode (e.g., visual output system 250 may emit light until control interface 30 is operated into a safety mode). In various embodiments, the emitting time may be defined by an audio output time (e.g., a visual output time may be the same as an audio output time).

A light emitting characteristic may define an emitting pattern. The emitting pattern may define how one or more light emitting components in visual output system 250 emit light. For example, the emitting pattern may define a continuous light emission, a strobing (e.g., non-continuous, etc.) light emission, or the like. The emitting pattern may also define an emitting order. The emitting order may define an order that one or more of the light emitting components of visual output system 250 are configured to output light. In various embodiments, the emitting pattern may define a charging pattern configured to simulate an electrical charging of the CEW. For example, light emitting components of visual output system 250 may be configured to slowly brighten (e.g., slowly amplify the amount of emitted light) to simulate an electrical charging. As a further example, light emitting components of visual output system 250 may be configured to emit light in a sequence from top to bottom (or bottom to top) of a deployment end of the CEW, front to back (e.g., deployment end to handle end) (or back to front) of a CEW, or the like.

Instructions controlling visual output system 250 (e.g., visual output instructions) may be stored in memory and executed by a processor (e.g., processing circuit 35), as previously discussed. The instructions may include one or more light emitting characteristics. In various embodiments, one or more light emitting characteristics may also be defined by physical characteristics and/or firmware of one or more light emitting components of visual output system 250.

Audio output system 270 may be configured to generate and/or output an audio output (e.g., an audio warning, an audio output warning, etc.). For example, the audio output may comprise sounds including speech, music, tones, prerecorded sounds, or any other type of audio output. Audio output system 270 may comprise one or more components configured to generate and/or output audio such as, for example, audio generating components (e.g., discrete soundcards, integrated soundcards, processors, processing circuits, integrated circuits, amplifier, etc.), audio output components (e.g., speakers), and/or the like.

In various embodiments, the audio output may also comprise a previously received audio input. For example, audio output system 270 (or CEW 1) may comprise an audio input component, such as one or more microphones. The audio input component may be configured to receive an audio input (such as human speech) and store the audio input in memory and/or output the audio input as the audio output. Outputting the audio input as the audio output may include changing one or more audio characteristics of the audio input, such as, for example, amplifying the audio input. Amplification may be achieved using any suitable software or hardware amplification technique.

Audio output system 270 may be configured to output the audio output from (or through) an exterior surface of the CEW. For example, audio output system 270 may be configured to output the audio output from a deployment end of the CEW (e.g., deployment end 14, with brief reference to FIG. 1). In that regard, audio output system 270 may be at least partially located proximate a deployment end of the CEW (e.g., as depicted in FIGS. 3A-5B). For example, a speaker of audio output system 270 may be located on a deployment end of a CEW. As a further example, a speaker of audio output system 270 may be located at any other exterior surface position on a CEW whereby a potential target may perceive the audio output. As a further example, a speaker of audio output system 270 may be located at an internal location within a CEW, and configured to output an audio output from the CEW at a sufficient intensity that a potential target may perceive the audio output.

The audio output may comprise a frequency and intensity within a human's audible spectrum. For example, research has shown that a human can generally perceive sounds in a frequency range of about 20 Hz to about 20 kHz (with the upper range decreasing as a human ages). Audio outputs having an intensity between 0 dB and about 90 dB are generally considered safe for the human ear, and audio outputs having an intensity above about 90 dB may cause damage to a human's inner ear. The dynamic range of audio intensities safe for human perception may vary based on the frequency of the audio output, and are well known in the art. In that respect, the audio output may be tailored to comprise a frequency perceivable by a human and an intensity safe for human perception (e.g., to protect the user operating the CEW).

In various embodiments, an audio output may comprise a frequency perceivable by only a select age range (e.g., an age-based audio output). For example, in some circumstances it may be desirable to produce an audio output configured to break up crowds loitering or engaging in unlawful conduct. Producing a high-frequency audio output that may be perceived by certain age ranges may aid in accomplishing this goal, while also minimizing disturbing those not engaged in the loitering or unlawful conduct. Frequency ranges audible to humans based on age ranges are known in the art, and any suitable solution may be implemented in audio output system 270.

In various embodiments, audio output system 270 may output any suitable or desired audio output, or series of audio outputs. An audio output may comprise a warning sound. The warning sound may comprise any audio output configured to warn a target of a potential deployment of the CEW. For example, the warning sound may comprise a horn sound, a siren sound, a beeping sound, and/or the like. An audio output may comprise a charging sound. The charging sound may be configured to simulate an electrical charging sound, such as an electrical charging of the CEW. For example, the charging sound may slowly be output at a greater intensity to simulate the electrical charging. As a further example, the charging sound may be similar to a camera flash charging sound, a rising electronic tone, and/or any other similar or suitable charging sound. An audio output may comprise a speech output. The speech output may be configured to warn a target of a potential deployment of the CEW, and may comprise speech configured to provide the warning (e.g., "Warning!", "This CEW is now active", etc.). The speech output may comprise prerecorded speech. For example, the prerecorded speech may comprise a digital audio file comprising human speech (or machine speech, using a text-to-speech service). The prerecorded speech may be stored in memory in audio output system 270, warning system 100, and/or any other component in a CEW.

In various embodiments, an audio output may be configured to at least partially aid in deterring animals. For example, an audio output may comprise an animal deterrent output. The animal deterrent output may comprise a frequency and/or intensity configured to make an animal uncomfortable, irritated, etc. The animal deterrent output may also comprise a frequency and/or intensity configured to repel an animal (e.g., cause an animal to flee) or cause pain in the animal. As an example, research has shown that many animals such as dogs, cats, rodents, and the like, can hear sounds at ultrasonic frequencies (e.g., sounds having a frequency greater than about 20 kHz). In that regard, the animal deterrent output may comprise a frequency that is inaudible to humans, but audible and irritable to certain animals. In various embodiments, the animal deterrent output may be configured to deter a dog. The animal deterrent output may comprise a frequency and/or intensity configured to deter a dog, such as, for example, a frequency of about 25 kHz to about 45 kHz, about 35 kHz to about 45 kHz, and/or any other frequency range configured to deter or irritate a dog. The range of audio intensities configured to deter a dog may vary based on the frequency of the animal deterrent output.

In various embodiments, an animal deterrent output may be output together with the audio output (e.g., the audio output comprises the animal deterrent output). In various embodiments, an animal deterrent output may be output separately from the audio output (e.g., the animal deterrent output is a second audio output discrete from the audio output). In some circumstances, it may be desirable to output an audio output without including an animal deterrent output. For example, a law enforcement officer may have a police dog. In response to an operator of a CEW being a law enforcement officer having a police dog, it may be desirable to output an audio output that does not include an animal deterrent output that may irritate or deter that police dog.

In various embodiments, output of an animal deterrent output may be selectable by an operator of a CEW. For example, a control interface of a CEW may include a mode for outputting the animal deterrent output (e.g., an animal deterrent mode, a deterrent mode, etc.). In response to the operator operating the control interface into the animal deterrent mode, the CEW may output the animal deterrent output.

As a further example, and in accordance with various embodiments, a CEW may also include a control separate from the control interface, such as a button, switch, or the like, configured to enable output of the animal deterrent output (e.g., an animal deterrent control, a deterrent control, etc.). In response to the operator operating the animal deterrent control, the CEW may output the animal deterrent output.

In various embodiments, audio output system 270 may output the audio output based on an audio output characteristic. The audio output characteristic may define characteristics or properties of audio output system 270 and/or the audio output. An audio output characteristic may define an output time (e.g., an audio output time). The output time may define a period of time that audio output system 270 outputs the audio output (e.g., 5 seconds, 10 seconds, 20 seconds, 30 second, 1 minute, etc.). In various embodiments, the output time may be defined by the period of time control interface 30 is in an active mode (e.g., audio output system 270 may output the audio output until control interface 30 is operated into a safety mode). In various embodiments, the output time may be defined by the emitting time (e.g., an audio output time may be the same as a visual output time).

An audio output characteristic may define an output pattern (e.g., an audio output pattern). The output pattern may define an order that one or more audio outputs are output in, in response to audio output system 270 being activated. In various embodiments, each audio output in the output pattern may comprise a defined audio output time (e.g., a first audio output is associated with a first audio output time, a second audio output is associated with a second audio output time, etc.). An audio output characteristic may define an output intensity (e.g., an audio output intensity, an audio volume, etc.). In various embodiments, each audio output in an output pattern may comprise a defined audio output intensity (e.g., a first audio output is associated with a first audio output intensity, a second audio output is associated with a second audio output intensity, etc.).

In various embodiments, the output pattern may define a first output indicating that the CEW is operated into an armed mode (e.g., "CEW armed," a powering up sound, etc.) and a subsequent output (e.g., second output, third output, etc.) indicating that deployment of the CEW may be imminent. In various embodiments, the output pattern may also define a final output indicating that the CEW is operated into a safety mode (e.g., "CEW disarmed", a powering down sound, etc.).

Instructions controlling audio output system 270 (e.g., audio output instructions) may be stored in memory and executed by a processor (e.g., processing circuit 35), as previously discussed. The instructions may include one or more audio output characteristics. In various embodiments, one or more audio output characteristics may also be defined by physical characteristics and/or firmware of one or more components of audio output system 270.

In various embodiments, the audio output time may be the same as the visual output time. In various embodiments, the audio output time may be different from the visual output time (e.g., the audio output time may be shorter or longer than the visual output time).

In response to warning system 100 being activated, visual output system 250 and/or audio output system 270 may be activated in any order. For example, and in accordance with various embodiments, visual output system 250 and audio output system 270 may be activated at the same time such that visual output system 250 emits a visual output at the same time (or in near time) as audio output system 270 outputs an audio output. Visual output system 250 and/or audio output system 270 may be As a further example, and in accordance with various embodiments, visual output system 250 may be activated before audio output system 270 such that visual output system 250 emits a visual output before audio output system 270 outputs an audio output. As a further example, and in accordance with various embodiments, audio output system 270 may be activated before visual output system 250 such that audio output system 270 outputs an audio output before visual output system 250 emits a visual output.

In various embodiments, only audio output system 270 may be activated to output an audio output. In various embodiments, only visual output system 250 may be activated to output a visual output.

In various embodiments, audio output system 270 may be configured to provide a directional audio output (e.g., a targeted audio output, a directed audio output, etc.). The directional audio output may be configured to focus (e.g., direct) the audio output towards one or more targets (or desired locations). For example, and in accordance with various embodiments, audio output system 270 may comprise a directional audio speaker, such as a focused speaker, a parametric speaker, or the like. The directional audio speaker may be configured to deliver an audio output in a focused direction, such as, for example, towards a target or a desired location. Audio output system 270 may utilize any suitable hardware and/or software configured to deliver the audio output in a focused direction.

The directional audio output may be configured to focus the audio output towards one or more targets (or desired locations) by minimizing the audio output perceivable by the operator of the CEW. For example, audio output system 270 may comprise a first speaker configured to provide the audio output and a second speaker configured to provide active noise control (e.g., noise cancellation) for the operator. The first speaker may be configured to at least partially provide the audio output in a direction away from the operator. The second speaker may be configured to at least partially provide the active noise control in a direction towards the operator. Active noise control via software and hardware implementations are well known in the art, and audio output system 270 may utilize any suitable active noise control technique.

The directional audio output may be configured to focus (e.g., direct) the audio output towards one or more targets (or desired locations) while also preserving silence or minimizing the audio output perceivable by the operator of the CEW. For example, audio output system 270 may comprise both a directional audio speaker and a second speaker capable of providing active noise control, as previously discussed.

In various embodiments, and with reference to FIGS. 3A and 3B, an exemplary CEW 300 is disclosed. CEW 300 may be similar to, or have similar aspects and/or components with, any CEW discussed herein, including without limitation CEW 1, CEW 400, and/or CEW 500 (with brief references to FIGS. 1 and 4A-5B). For the sake of brevity, redundant characteristics or elements of a CEW previously described herein may be omitted in describing CEW 300 below.

CEW 300 may comprise a housing 310. Housing 310 may be similar to, or have similar aspects and/or components with, any housing discussed herein. Housing 310 may comprise and/or enclose one or more internal components configured to aid in operation of CEW 300 such as, for example, a processing circuit, a power supply, a signal generator, and/or the like (not depicted). The processing circuit, the power supply, the signal generator, and/or any other internal component of CEW 300 may be similar to any other processing circuit, power supply, signal generator, or the like discussed herein.

Housing 310 may comprise a handle end 312 opposite a deployment end 314. Handle end 312 may be similar to, or have similar aspects and/or components with, any handle end discussed herein. Deployment end 314 may be similar to, or have similar aspects and/or components with, any deployment end discussed herein.

Housing 310 may comprise a guard 316. Guard 316 may define an opening formed in housing 310. Guard 316 may be located on a center region of housing 310 (e.g., as depicted in FIGS. 3A and 3B), and/or in any other suitable location on housing 310. CEW 300 may comprise a trigger 318 disposed within guard 316. Guard 316 may be configured to protect trigger 318 from unintentional physical contact (e.g., an unintentional activation of trigger 318). Guard 316 may surround trigger 318 within housing 310. Trigger 318 may be similar to, or have similar aspects and/or components with, any trigger discussed herein. Trigger 318 be coupled to an outer surface of housing 310, and may be configured to move, slide, rotate, or otherwise become physically depressed or moved upon application of physical contact. For example, trigger 318 may be actuated by physical contact applied to trigger 318 from within guard 316. Trigger 318 may comprise a mechanical or electromechanical switch, button, trigger, or the like. For example, trigger 318 may comprise a switch, a pushbutton, and/or any other suitable type of trigger. Trigger 318 may be mechanically and/or electronically coupled to a processing circuit. In response to trigger 318 being activated (e.g., depressed, pushed, etc. by the user), the processing circuit may cause deployment of one or more projectiles from CEW 300, as discussed further herein.

CEW 300 may comprise a system or apparatus (e.g., an aiming system, an aiming apparatus, etc.) to aid in accurately deploying projectiles. For example, CEW 300 may comprise a front sight 307 and a rear sight 308. Front sight 307 and rear right 308 may be coupled to an outer surface of housing 310, such as, for example, a top portion of housing 310 opposite handle end 312 (e.g., as depicted in FIGS. 3A and 3B). Front sight 307 may be collinear with rear sight 308. For example, rear sight 308 may define a "U" shaped void, or similar rectangular shaped void. In operation of CEW 300, a user may visually align front sight 307 within the void of rear sight 308 to ensure projectiles are accurately deployed. In various embodiment, CEW 300 may also comprise a telescopic sight (e.g., a scope, an optical sighting device, etc.), a laser sight, a red-dot sight, a holographic sight, a fiber-optic sight, and/or any other suitable or desired system or apparatus to aid in aiming CEW 300.

In various embodiments, CEW 300 may comprise one or more deployment units 320. Deployment unit 320 may be similar to, or have similar aspects and/or components with, any deployment unit discussed herein (e.g., deployment unit 20, with brief reference to FIG. 1). Housing 310 may be configured to receive any suitable or desired number of deployment units 320, such as, for example, one deployment unit, two deployment units, three deployment units, etc. Deployment unit 320 may comprise a propulsion system (not depicted) and a plurality of projectiles 327. The propulsion system may be similar to, or have similar aspects and/or components with, any propulsion system discussed herein (e.g., propulsion system 25, with brief reference to FIG. 1). The propulsion system may be coupled to, on in communication with, one or more projectiles 327. The propulsion system may be configured to provide a propulsion force to deploy one or more projectiles 327. Activation of the propulsion system may be controlled by operation of trigger 318, as discussed herein.

Projectiles 327 may be similar to, or have similar aspects and/or components with, any projectile, electrode, dart, or similar apparatus discussed herein (e.g., projectiles 27, 28, with brief reference to FIG. 1). Although depicted comprising ten projectiles 327, deployment unit 320 may comprise any suitable or desired number of projectiles 327, such as, for example two projectiles, three projectiles, nine projectiles, twelve projectiles, eighteen projectiles, and/or any other desired number of projectiles. Each projectile 327 may comprise any suitable type of projectile. For example, one or more projectiles 327 may be or include an electrode (e.g., an electrode dart). An electrode may include a spear portion, designed to pierce or attach proximate a tissue of a target in order to provide a conductive electrical path between the electrode and the tissue, as previously discussed herein. Projectiles 327 may also be launched by one or more propulsion forces received from one or more propulsion systems.

In various embodiments, CEW 300 may comprise a safety switch 330. Safety switch 330 may be similar to, or have similar aspects and/or components with, any control interface, safety member, or the like discussed herein (e.g., control interface 30, with brief reference to FIG. 1). Safety switch 330 may be located in any suitable location on or in housing 310. For example, safety switch 330 may be coupled to an outer surface of housing 310. Safety switch 330 may be coupled to an outer surface of housing 310 proximate trigger 318 and/or guard 316.

Safety switch 330 may comprise a switch, button, lever, or similar mechanical arrangement configured to control operation of CEW 300. For example, safety switch 330 may be operable between a safety mode (e.g., as depicted in FIG. 3A) and an active mode (e.g., as depicted in FIG. 3B). In various embodiments, safety switch 330 may also be operable into one or more additional modes. Safety switch 330 may be configured to control selection of firing modes in CEW 300. Safety switch 330 may also be configured to control activation of a warning system on CEW 300. For example, in response to safety switch 330 being in an active mode, safety switch 330 may enable firing of CEW 300 and activate a warning system. In response to safety switch 330 being in a safety mode, safety switch 330 may disable firing capabilities of CEW 300 and may deactivate, or not activate, the warning system.

In various embodiments, a warning system of CEW 300 may include one or more visual output systems 350 and/or one or more audio output systems 370. The warning system of CEW 300 may be similar to, or have similar aspects and/or components with, any warning system discussed herein (e.g., warning system 100, with brief reference to FIGS. 1 and 2). For example, the warning system may be configured to output a warning in response to CEW 300 (e.g., safety switch 330) being operated into an active mode. The warning may function to encourage a target to stop moving and/or comply with requests from the user deploying CEW 300. For example, the warning may be configured to provide notice to the target that CEW 300 is no longer in a safety mode and that deployment of CEW 300 may be imminent.

Visual output system 350 may be similar to, or have similar aspects and/or components with, any visual output system discussed herein (e.g., visual output system 250, with brief reference to FIG. 1). For example, visual output system 350 may be configured to generate and/or output a visual output (e.g., a visual warning, a visual output warning, etc.). The visual output may comprise an emitted light. Visual output system 350 may be configured to emit the light from (or through) an exterior surface of CEW 300, and/or at any other suitable location on or in CEW 300 whereby a potential target may perceive the visual output.

In accordance with various embodiments, an exemplary warning system may comprise a first visual output system 350-1, a second visual output system 350-2, a third visual output system 350-3, and/or any other number of visual output systems. Visual output systems 350-1, 350-2, 350-3 may be located on an outer surface of deployment end 314. For example, visual output systems 350-1, 350-2, 350-3 may be located on an outer surface of deployment end 314 proximate a bay configured to receive deployment unit 320 (e.g., as depicted in FIGS. 3A and 3B). Each visual output system 350-1, 350-2, 350-3 may have any suitable orientation (e.g., vertical orientation as depicted with visual output system 350-1, 350-2; horizontal orientation as depicted with visual output system 350-3; etc.). Each visual output system 350-1, 350-2, 350-3 may comprise one or more light emitting components 355. Each light emitting component 355 may comprise components configured to emit light such as, for example, a light emitting diode (LED).

One or more visual output systems 350-1, 350-2, 350-3 may be configured to emit light as a colored light, based on a light emitting characteristic and/or an emitting pattern, or the like, as discussed previously herein.

In various embodiments, one or more first light emitting characteristics of a first visual output system may be different from one or more second light emitting characteristics of a second visual output system. The one or more first light emitting characteristics may include a first emitting angle that is broader than a second emitting angle of the one or more second light emitting characteristics. The one or more first light emitting characteristics may include a first emitting time that is earlier than a second emitting time of the one or more second light emitting characteristics, including for a same selection of a firing mode for CEW 300. The one or more first light emitting characteristics may include a first emitting color, a first emitting order, and/or a first emitting pattern that are respectively different from a second emitting color, a second emitting order, and/or a second emitting pattern of the one or more second light emitting characteristics, including for a same operation of safety switch 330. For example, visual output system 350-1 may comprise one or more light emitting diodes with a broad emitting angle, while visual output system 350-3 may comprise one or more laser light sources with a coherent, narrower emitting angle. Visual output system 350-1 may alternately or additionally have a later emitting time compared to visual output system 350-2, including for a same operation of safety switch 330. Light emitting components of visual output system 350-1 may output light sequentially, while light emitting components of visual output system 350-3 may output light at a same time in accordance with different emitting orders for visual output system 350-1 and visual output system 350-3. Other differences in one or more light emitting characteristics between different visual output systems may be provided as well in embodiments according to various aspects of the present disclosure.

Audio output system 370 may be similar to, or have similar aspects and/or components with, any audio output system discussed herein (e.g., audio output system 270, with brief reference to FIG. 1). For example, audio output system 370 may be configured to generate and/or output an audio output (e.g., an audio warning, an audio output warning, etc.). The audio output may comprise sounds including speech, music, tones, prerecorded sounds, or any other type of audio output. Audio output system 370 may be configured to output the audio output from (or through) an exterior surface of the CEW, and/or at any other suitable location on or in CEW 300 whereby a potential target may perceive the audio output.

In various embodiments, audio output system 370 may be located on an outer surface of deployment end 314. For example, audio output system 370 may be located on an outer surface of deployment end 314 proximate a bay configured to receive deployment unit 320 (e.g., as depicted in FIGS. 3A and 3B). Audio output system 370 may comprise one or more components configured to generate and/or output audio such as, for example, audio generating components (e.g., discrete soundcards, integrated soundcards, processors, processing circuits, integrated circuits, amplifier, etc.), audio output components (e.g., speakers), and/or the like.

Audio output system 370 may be configured to output the audio output as a warning sound, a charging sound, a speech output, an animal deterrent output, or the like, as discussed previously herein. Audio output system 370 may be configured to output the audio output based on an audio output characteristic, as discussed previously herein.

In accordance with various embodiments, FIG. 3A depicts CEW 300 having safety switch 330 in a safety mode. In the safety mode, visual output systems 350-1, 350-2, 350-3 and audio output system 370 are configured to not output a warning (e.g., a visual output and an audio output).

In accordance with various embodiments, FIG. 3B depicts CEW 300 having safety switch 330 in an active mode. In the active mode, visual output systems 350-1, 350-2, 350-3 and audio output system 370 are configured to output a warning (e.g., a visual output and an audio output). For example, visual output systems 350-1, 350-2, 350-3 and audio output system 370 may output the warning in response to safety switch 330 being in the active mode, for the entirety safety switch 330 is in the active mode, based on an output time (e.g., a visual output time and/or an audio output time), and/or the like.

In response to a user operating safety switch 330 from the safety mode into the active mode, a processing circuit of CEW 300 may detect (e.g., mechanically, electronically, electrically, etc.) that safety switch 330 is in the active mode. In response to detecting that safety switch 330 is in the active mode, the processing circuit may activate visual output systems 350-1, 350-2, 350-3 and/or audio output system 370 to output a warning (e.g., a visual output and an audio output). The processing circuit may activate visual output systems 350-1, 350-2, 350-3 and/or audio output system 370 using any suitable process.

As an example, and in accordance with various embodiments, in response to detecting that safety switch 330 is in the active mode the processing circuit may be configured to control and/or coordinate operation of some or all aspects of visual output systems 350-1, 350-2, 350-3 and/or audio output system 370. The processing circuit may include (or be in communication with) memory (e.g., tangible non-transitory memory) configured to store instructions (e.g., warning instructions). The instructions may include data that, in response to being executed by the processing circuit, control operation and function of one or more visual output systems 350-1, 350-2, 350-3 and/or audio output system 370. For example, the instructions may include one or more light emitting characteristics, audio output characteristics, output times (e.g., audio output times and/or visual output times), and/or the like. In that regard, in response to detecting that safety switch 330 is in the active mode, the processing circuit may execute the instructions stored in the memory. In response to executing the instructions, the processing circuit may communicate with and/or control one or more visual output systems 350-1, 350-2, 350-3 and/or audio output system 370 to output the warning.

As a further example, and in accordance with various embodiments, in response to detecting that safety switch 330 is in the active mode the processing circuit may control an electrical switch to provide power to visual output systems 350-1, 350-2, 350-3 and/or audio output system 370. The electrical switch may be located in an electrical circuit between one or more of visual output systems 350-1, 350-2, 350-3 and/or audio output system 370, and a power supply in CEW 300. In response to the electrical circuit being completed, one or more of visual output systems 350-1, 350-2, 350-3 and/or audio output system 370 may receive the power and may output the warning.

In response to a user operating safety switch 330 from the active mode into the safety mode (e.g., as depicted in FIG. 3A), the processing circuit of CEW 300 may deactivate, or cease instructing or controlling, visual output systems 350-1, 350-2, 350-3 and/or audio output system 370 (e.g., to no longer output the warning).

In various embodiments, CEW 300 may also be configured to activate or change the output of visual output systems 350-1, 350-2, 350-3 and/or audio output system 370 responsive to an intermediary event, such as, for example, in response to a trigger activation. Changing the output of one or more of visual output systems 350-1, 350-2, 350-3 and/or audio output system 370 may include providing a second visual output and/or second audio output that is at least partially different from previously providing visual outputs or audio outputs.

In various embodiments, and with reference to FIGS. 4A and 4B, an exemplary CEW 400 is disclosed. CEW 400 may be similar to, or have similar aspects and/or components with, any CEW discussed herein, including without limitation CEW 1, CEW 300, and/or CEW 500 (with brief references to FIGS. 1, 3A, 3B, 5A, and 5B). For the sake of brevity, redundant characteristics or elements of a CEW previously described herein may be omitted in describing CEW 400 below.

CEW 400 may comprise a housing 410. Housing 410 may be similar to, or have similar aspects and/or components with, any housing discussed herein. Housing 410 may comprise and/or enclose one or more internal components configured to aid in operation of CEW 400 such as, for example, a processing circuit, a power supply, a signal generator, and/or the like (not depicted). The processing circuit, the power supply, the signal generator, and/or any other internal component of CEW 400 may be similar to any other processing circuit, power supply, signal generator, or the like discussed herein.

Housing 410 may comprise a handle end 412 opposite a deployment end 414. Handle end 412 may be similar to, or have similar aspects and/or components with, any handle end discussed herein. Deployment end 414 may be similar to, or have similar aspects and/or components with, any deployment end discussed herein.

Housing 410 may comprise a guard 416. Guard 416 may define an opening formed in housing 410. Guard 416 may be located on a center region of housing 410 (e.g., as depicted in FIGS. 4A and 4B), and/or in any other suitable location on housing 410. CEW 400 may comprise a trigger 418 disposed within guard 416. Guard 416 may be configured to protect trigger 418 from unintentional physical contact (e.g., an unintentional activation of trigger 418). Guard 416 may surround trigger 418 within housing 410. Trigger 418 may be similar to, or have similar aspects and/or components with, any trigger discussed herein. Trigger 418 be coupled to an outer surface of housing 410, and may be configured to move, slide, rotate, or otherwise become physically depressed or moved upon application of physical contact. For example, trigger 418 may be actuated by physical contact applied to trigger 418 from within guard 416. Trigger 418 may comprise a mechanical or electromechanical switch, button, trigger, or the like. For example, trigger 418 may comprise a switch, a pushbutton, and/or any other suitable type of trigger. Trigger 418 may be mechanically and/or electronically coupled to a processing circuit. In response to trigger 418 being activated (e.g., depressed, pushed, etc. by the user), the processing circuit may cause deployment of one or more projectiles from CEW 400, as discussed further herein.

CEW 400 may comprise a system or apparatus (e.g., an aiming system, an aiming apparatus, etc.) to aid in accurately deploying projectiles. For example, CEW 400 may comprise a front sight 407 and a rear sight 408. Front sight 407 and rear right 408 may be coupled to an outer surface of housing 410, such as, for example, a top portion of housing 410 opposite handle end 412 (e.g., as depicted in FIGS. 4A and 4B). In various embodiments, front sight 407 may be coupled to an outer surface of safety slide 430. Front sight 407 may be collinear with rear sight 408. For example, rear sight 408 may define a "U" shaped void, or similar rectangular shaped void. In operation of CEW 300, a user may visually align front sight 407 within the void of rear sight 408 to ensure projectiles are accurately deployed. In various embodiment, CEW 400 may also comprise a telescopic sight (e.g., a scope, an optical sighting device, etc.), a laser sight, a red-dot sight, a holographic sight, a fiber-optic sight, and/or any other suitable or desired system or apparatus to aid in aiming CEW 400.

In various embodiments, CEW 400 may comprise one or more deployment units 420. Deployment unit 420 may be similar to, or have similar aspects and/or components with, any deployment unit discussed herein (e.g., deployment unit 20, with brief reference to FIG. 1). Housing 410 may be configured to receive any suitable or desired number of deployment units 420, such as, for example, one deployment unit, two deployment units, three deployment units, etc. Deployment unit 420 may comprise a propulsion system (not depicted) and a plurality of projectiles 427. The propulsion system may be similar to, or have similar aspects and/or components with, any propulsion system discussed herein (e.g., propulsion system 25, with brief reference to FIG. 1). The propulsion system may be coupled to, on in communication with, one or more projectiles 427. The propulsion system may be configured to provide a propulsion force to deploy one or more projectiles 427. Activation of the propulsion system may be controlled by operation of trigger 418, as discussed herein.

Projectiles 427 may be similar to, or have similar aspects and/or components with, any projectile, electrode, dart, or similar apparatus discussed herein (e.g., projectiles 27, 28, with brief reference to FIG. 1). Although depicted comprising ten projectiles 427, deployment unit 420 may comprise any suitable or desired number of projectiles 427, such as, for example two projectiles, three projectiles, nine projectiles, twelve projectiles, eighteen projectiles, and/or any other desired number of projectiles. Each projectile 427 may comprise any suitable type of projectile. For example, one or more projectiles 427 may be or include an electrode (e.g., an electrode dart). An electrode may include a spear portion, designed to pierce or attach proximate a tissue of a target in order to provide a conductive electrical path between the electrode and the tissue, as previously discussed herein. Projectiles 427 may also be launched by one or more propulsion forces received from one or more propulsion systems.

In various embodiments, CEW 400 may comprise a safety slide 430. Safety slide 430 may be similar to, or have similar aspects and/or components with, any control interface, safety member, or the like discussed herein (e.g., control interface 30, with brief reference to FIG. 1). Safety slide 430 may be located in any suitable location on or in housing 410. Safety slide 430 may be coupled to an outer surface of housing 410 between deployment end 414 and guard 416. For example, safety slide 430 may be U-shaped, or a similar rectangular shape, and may be coupled to first side, a top, and a second side of housing 410 (e.g., as depicted in FIGS. 4A and 4B).

Safety slide 430 may be configured to control selection of firing modes in CEW 400. Safety slide 430 may also be configured to control activation of a warning system on CEW 400. For example, in response to safety slide 430 being in an active mode, safety slide 430 may enable firing of CEW 400 and activate a warning system. In response to safety slide 430 being in a safety mode, safety slide 430 may disable firing capabilities of CEW 400 and may deactivate, or not activate, the warning system.

Safety slide 430 may be slidably coupled to housing 410 and configured to slide between a safety mode and an active mode. For example, safety slide 430 may be configured to reciprocate between a first position and a second position. In the first position, as depicted in FIG. 4A, a front end of safety slide 430 may be aligned, or substantially aligned, with a front end of deployment end 414. In the second position, as depicted in FIG. 4B, the front end of safety slide 420 may not be aligned, or substantially aligned, with the front end of deployment end 414. In the second position, safety slide 430 may be closer (in physical proximity) to rear sight 408 compared to in the first position. In various embodiments, safety slide 430 may also be configured to reciprocate into a third position, or any additional number of positions. In various embodiments, safety slide 430 may be in the safety mode in response to being in the first position (e.g., as depicted in FIG. 4A), and in the active mode in response to being in the second position (e.g., as depicted in FIG. 4B). In various embodiments, safety slide 430 may also be configured to enter a safety mode, an active mode, or the like based on any other combination of positions.

In various embodiments, safety slide 430 may be configured to at least partially physically conceal a visual output system of the warning system in response to being in the first position, and at least partially physically reveal the visual output system in response to being in the second position. For example, in the first position safety slide 430 may physically conceal a fourth visual output system 450-4 and a fifth visual output system 450-5 of a visual output system, as discussed further herein (e.g., as depicted in FIG. 4A). In the second position safety slide 430 may no longer physically conceal fourth visual output system 450-4 and fifth visual output system 450-5 of the visual output system, as discussed further herein (e.g., as depicted in FIG. 4B).

In various embodiments, housing 410 may comprise one or more mechanical stops configured to retain safety slide

430 in the first position or the second position. For example, housing 410 may comprise, or have coupled to an outer surface, a first mechanical stop and a second mechanical stop. The first mechanical stop may be configured to retain safety slide 430 in the first position. The second mechanical stop may be configured to retain safety slide 430 in the second position. Each mechanical stop may be configured to interact with an inner surface of safety slide 430 to aid in retaining safety slide 430 in the first position or the second position. The interaction between the inner surface of safety slide 430 and a mechanical stop may create an interference to at least partially retain the safety slide 430 in the first position or the second position. In that regard, a physical manipulation by a user (e.g., a rack, a slide, a reciprocating action, etc.) may be required to reciprocate safety slide 430 from the first position to the second position, and/or from the second position to the first position.

In various embodiments, the mechanical stops may be coupled to the inner surface of safety slide 430, and may be configured to interact with an outer surface of housing 410 to retain safety slide 430 in the first position or the second position. The mechanical stops may also be configured to aid in slidably coupling safety slide 430 to housing 410. For example, the outer surface of housing 410 may comprise a groove. The mechanical stops may be configured to be inserted (or retained) within the groove to couple safety slide 430 to housing 410 (while also enabling safety slide 430 to reciprocate between the first position and the second position).

In various embodiments, safety slide 430 may comprise, or be similar to, a firearm slide, gun slide, pistol slide, or the like, such as those often found on semi-automatic weapons. In contrast to typical firearm slides configured to expel spent cartridges, cock a hammer or striker for a subsequent firing, and load a next cartridge for the subsequent firing, safety slide 430 may be configured to enable or disable firing of CEW 400 and/or activate or deactivate a warning system, as discussed further herein.

In various embodiments, a warning system of CEW 400 may include one or more visual output systems 450 and/or one or more audio output systems 470. The warning system of CEW 400 may be similar to, or have similar aspects and/or components with, any warning system discussed herein (e.g., warning system 100, with brief reference to FIGS. 1 and 2). For example, the warning system may be configured to output a warning in response to CEW 400 (e.g., safety slide 430) being operated into an active mode. The warning may function to encourage a target to stop moving and/or comply with requests from the user deploying CEW 400. For example, the warning may be configured to provide notice to the target that CEW 400 is no longer in a safety mode and that deployment of CEW 400 may be imminent.

Visual output system 450 may be similar to, or have similar aspects and/or components with, any visual output system discussed herein (e.g., visual output system 250, with brief reference to FIG. 1). For example, visual output system 450 may be configured to generate and/or output a visual output (e.g., a visual warning, a visual output warning, etc.). The visual output may comprise an emitted light. Visual output system 450 may be configured to emit the light from (or through) an exterior surface of CEW 400, and/or at any other suitable location on or in CEW 400 whereby a potential target may perceive the visual output.

In accordance with various embodiments, an exemplary warning system may comprise a first visual output system 450-1, a second visual output system 450-2, a third visual output system 450-3, a fourth visual output system 450-4, a fifth visual output system 450-5, and/or any other number of visual output systems. Visual output systems 450-1, 450-2, 450-3, 450-4, 450-5 may be located on an outer surface of deployment end 414. For example, visual output systems 450-1, 450-2, 450-3 may be located on an outer surface of deployment end 414 proximate a bay configured to receive deployment unit 420 (e.g., as depicted in FIGS. 4A and 4B). Visual output systems 450-4, 450-5 may be located on an outer surface of deployment end 414 at a location concealable by safety slide 430. For example, in response to safety slide 430 being in a safety mode, visual output systems 450-4, 450-5 may be physically concealed under safety slide 430 (e.g., as depicted in FIG. 4A). In response to safety slide 430 being in an active mode, visual output systems 450-4, 450-5 may no longer be physically concealed under safety slide 430 (e.g., as depicted in FIG. 4B).

Each visual output system 450-1, 450-2, 450-3, 450-4, 450-5 may have any suitable orientation (e.g., a vertical orientation with respect to visual output system 450-1, 450-2, 450-4, 450-5 (not depicted); a horizontal orientation with respect to visual output system 450-3; etc.). Each visual output system 450-1, 450-2, 450-3, 450-4, 450-5 may comprise one or more light emitting components 455. Each light emitting component 455 may comprise components configured to emit light such as, for example, a light emitting diode (LED).

One or more visual output systems 450-1, 450-2, 450-3, 450-4, 450-5 may be configured to emit light as a colored light, based on a light emitting characteristic and/or an emitting pattern, or the like, as discussed previously herein. In various embodiments, one or more visual output systems 450-1, 450-2, 450-3, 450-4, 450-5 may have one or more different light emitting characteristics and/or one or more different orientations relative to another visual output system of the one or more visual output systems 450-1, 450-2, 450-3, 450-4, 450-5. For example, visual output system 450-4 may have a different orientation from visual output system 450-2. The different orientation may include a perpendicular relative orientation between visual output system 450-4 and visual output system 450-2, corresponding at least in part to visual output system 450-4 being located on a different surface of deployment end 414 than a surface of deployment end 414 on which visual output system 450-2 is located.

Audio output system 470 may be similar to, or have similar aspects and/or components with, any audio output system discussed herein (e.g., audio output system 270, with brief reference to FIG. 1). For example, audio output system 470 may be configured to generate and/or output an audio output (e.g., an audio warning, an audio output warning, etc.). The audio output may comprise sounds including speech, music, tones, prerecorded sounds, or any other type of audio output. Audio output system 470 may be configured to output the audio output from (or through) an exterior surface of the CEW, and/or at any other suitable location on or in CEW 400 whereby a potential target may perceive the audio output.

In various embodiments, audio output system 470 may be located on an outer surface of deployment end 414. For example, audio output system 470 may be located on an outer surface of deployment end 414 proximate a bay configured to receive deployment unit 420 (e.g., as depicted in FIGS. 4A and 4B). Audio output system 470 may comprise one or more components configured to generate and/or output audio such as, for example, audio generating components (e.g., discrete soundcards, integrated soundcards, processors, processing circuits, integrated circuits, amplifier, etc.), audio output components (e.g., speakers), and/or the like.

Audio output system 470 may be configured to output the audio output as a warning sound, a charging sound, a speech output, an animal deterrent output, or the like, as discussed previously herein. Audio output system 470 may be configured to output the audio output based on an audio output characteristic, as discussed previously herein.

In accordance with various embodiments, FIG. 4A depicts CEW 400 having safety slide 430 in a safety mode. In the safety mode, visual output systems 450-1, 450-2, 450-3, 450-4, 450-5 and audio output system 470 are configured to not output a warning (e.g., a visual output and an audio output).

In accordance with various embodiments, FIG. 4B depicts CEW 400 having safety slide 430 in an active mode. In the active mode, visual output systems 450-1, 450-2, 450-3, 450-4, 450-5 and audio output system 470 are configured to output a warning (e.g., a visual output and an audio output). For example, visual output systems 450-1, 450-2, 450-3, 450-4, 450-5 and audio output system 470 may output the warning in response to safety slide 430 being in the active mode, for the entirety safety slide 430 is in the active mode, based on an output time (e.g., a visual output time and/or an audio output time), and/or the like.

In response to a user operating safety slide 430 from the safety mode into the active mode, a processing circuit of CEW 400 may detect (e.g., mechanically, electronically, electrically, etc.) that safety slide 430 is in the active mode. In response to detecting that safety slide 430 is in the active mode, the processing circuit may activate visual output systems 450-1, 450-2, 450-3, 450-4, 450-5 and/or audio output system 470 to output a warning (e.g., a visual output and an audio output). The processing circuit may activate visual output systems 450-1, 450-2, 450-3, 450-4, 450-5 and/or audio output system 470 using any suitable process.

As an example, and in accordance with various embodiments, in response to detecting that safety slide 430 is in the active mode the processing circuit may be configured to control and/or coordinate operation of some or all aspects of visual output systems 450-1, 450-2, 450-3, 450-4, 450-5 and/or audio output system 470. The processing circuit may include (or be in communication with) memory (e.g., tangible non-transitory memory) configured to store instructions (e.g., warning instructions). The instructions may include data that, in response to being executed by the processing circuit, control operation and function of one or more visual output systems 450-1, 450-2, 450-3, 450-4, 450-5 and/or audio output system 470. For example, the instructions may include one or more light emitting characteristics, audio output characteristics, output times (e.g., audio output times and/or visual output times), and/or the like. In that regard, in response to detecting that safety slide 430 is in the active mode, the processing circuit may execute the instructions stored in the memory. In response to executing the instructions, the processing circuit may communicate with and/or control one or more visual output systems 450-1, 450-2, 450-3, 450-4, 450-5 and/or audio output system 470 to output the warning.

As a further example, and in accordance with various embodiments, in response to detecting that safety slide 430 is in the active mode the processing circuit may control an electrical switch to provide power to visual output systems 450-1, 450-2, 450-3, 450-4, 450-5 and/or audio output system 470. The electrical switch may be located in an electrical circuit between one or more visual output systems 450-1, 450-2, 450-3, 450-4, 450-5 and/or audio output system 470, and a power supply in CEW 400. In response to the electrical circuit being completed, one or more of visual output systems 450-1, 450-2, 450-3, 450-4, 450-5 and/or audio output system 470 may receive the power and may output the warning.

In response to a user operating safety slide 430 from the active mode into the safety mode (e.g., as depicted in FIG. 4A), the processing circuit of CEW 400 may deactivate, or cease instructing or controlling, visual output systems 450-1, 450-2, 450-3, 450-4, 450-5 and/or audio output system 470 (e.g., to no longer output the warning).

In various embodiments, CEW 400 may also be configured to activate or change the output of visual output systems 450-1, 450-2, 450-3, 450-4, 450-5 and/or audio output system 470 responsive to an intermediary event, such as, for example, in response to a trigger activation. Changing the output of one or more of visual output systems 450-1, 450-2, 450-3, 450-4, 450-5 and/or audio output system 470 may include providing a second visual output and/or second audio output that is at least partially different from previously provided visual outputs or audio outputs.

In various embodiments, and with reference to FIGS. 5A and 5B, an exemplary CEW 500 is disclosed. CEW 500 may be similar to, or have similar aspects and/or components with, any CEW discussed herein, including without limitation CEW 1, CEW 300, and/or CEW 400 (with brief references to FIGS. 1 and 3A-4B). For the sake of brevity, redundant characteristics or elements of a CEW previously described herein may be omitted in describing CEW 500 below.

CEW 500 may comprise a housing 510. Housing 510 may be similar to, or have similar aspects and/or components with, any housing discussed herein. Housing 510 may comprise and/or enclose one or more internal components configured to aid in operation of CEW 500 such as, for example, a processing circuit, a power supply, a signal generator, and/or the like (not depicted). The processing circuit, the power supply, the signal generator, and/or any other internal component of CEW 500 may be similar to any other processing circuit, power supply, signal generator, or the like discussed herein.

Housing 510 may comprise a handle end 512 opposite a deployment end 514. Handle end 512 may be similar to, or have similar aspects and/or components with, any handle end discussed herein. Deployment end 514 may be similar to, or have similar aspects and/or components with, any deployment end discussed herein.

Housing 510 may comprise a guard 516 and a trigger 518 disposed within guard 516. Trigger 516 and/or guard 516 may be similar to, or have similar aspects and/or components with, any guard and/or trigger discussed herein.

CEW 500 may comprise a system or apparatus (e.g., an aiming system, an aiming apparatus, etc.) to aid in accurately deploying projectiles. For example, CEW 500 may comprise a front sight 507 and a rear sight 508. Front sight 507 and/or rear sight 508 may be similar to, or have similar aspects and/or components with, any front sight and/or rear sight discussed herein. In various embodiment, CEW 500 may also comprise a telescopic sight (e.g., a scope, an optical sighting device, etc.), a laser sight, a red-dot sight, a holographic sight, a fiber-optic sight, and/or any other suitable or desired system or apparatus to aid in aiming CEW 500.

In various embodiments, CEW 500 may comprise one or more deployment units 520. Deployment unit 520 may be similar to, or have similar aspects and/or components with, any deployment unit discussed herein. Housing 510 may be configured to receive any suitable or desired number of deployment units 520, such as, for example, one deployment unit, two deployment units, three deployment units, etc. Deployment unit 520 may comprise a propulsion system (not depicted) and a plurality of projectiles 527. The propulsion system may be similar to, or have similar aspects and/or components with, any propulsion system discussed herein. The propulsion system may be coupled to, on in communication with, one or more projectiles 527. The propulsion system may be configured to provide a propulsion force to deploy one or more projectiles 527. Activation of the propulsion system may be controlled by operation of trigger 518, as discussed herein.

Projectiles 527 may be similar to, or have similar aspects and/or components with, any projectile, electrode, dart, or similar apparatus discussed herein. Although depicted comprising ten projectiles 527, deployment unit 520 may comprise any suitable or desired number of projectiles 527, such as, for example two projectiles, three projectiles, nine projectiles, twelve projectiles, eighteen projectiles, and/or any other desired number of projectiles.

In various embodiments, CEW 500 may comprise a safety switch 530. Safety switch 530 may be similar to, or have similar aspects and/or components with, any control interface, safety member, safety switch, or the like discussed herein. Safety switch 530 may be operable between a safety mode (e.g., as depicted in FIG. 5A) and an active mode (e.g., as depicted in FIG. 5B). In various embodiments, safety switch 530 may also be operable into one or more additional modes. Safety switch 530 may be configured to control selection of firing modes in CEW 500. Safety switch 530 may also be configured to control activation of a warning system on CEW 500. For example, in response to safety switch 530 being in an active mode, safety switch 530 may enable firing of CEW 500 and activate a warning system. In response to safety switch 530 being in a safety mode, safety switch 530 may disable firing capabilities of CEW 500 and may deactivate, or not activate, the warning system.

In various embodiments, a warning system of CEW 500 may include one or more visual output systems and/or one or more audio output systems. The warning system of CEW 500 may be similar to, or have similar aspects and/or components with, any warning system discussed herein (e.g., warning system 100, with brief reference to FIGS. 1 and 2). For example, the warning system may be configured to output a warning in response to CEW 500 (e.g., safety switch 530) being operated into an active mode. The warning may function to encourage a target to stop moving and/or comply with requests from the user deploying CEW 500. For example, the warning may be configured to provide notice to the target that CEW 500 is no longer in a safety mode and that deployment of CEW 500 may be imminent.

Figure 2:
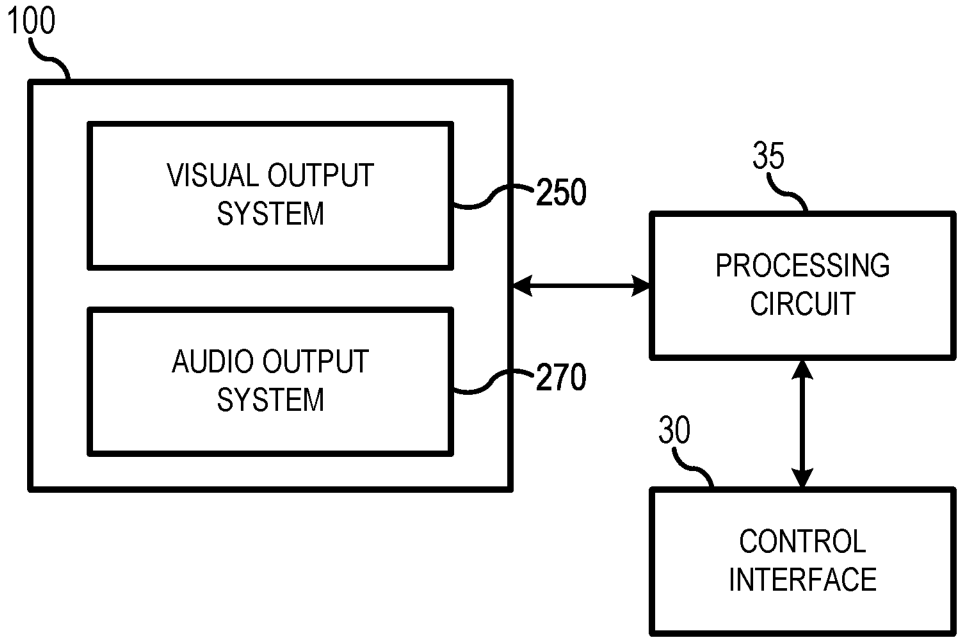
FIG. 2 illustrates a block diagram of a warning system for a conducted electrical weapon, in accordance with various embodiments.

A visual output system of CEW 500 may be similar to, or have similar aspects and/or components with, any visual output system discussed herein (e.g., visual output system 250, with brief reference to FIG. 2). For example, the visual output system may be configured to generate and/or output a visual output (e.g., a visual warning, a visual output warning, etc.). The visual output may comprise an emitted light. The visual output system may be configured to emit the light from (or through) an exterior surface of CEW 500, and/or at any other suitable location on or in CEW 500 whereby a potential target may perceive the visual output.

In accordance with various embodiments, an exemplary warning system may comprise a first visual output system 550-1 and a second visual output system 550-2. Visual output systems 550-1, 550-2 may be located on an outer surface of housing 510. For example, visual output systems 550-1, 550-2 may be located on an outer surface of deployment end 514 proximate a bay configured to receive deployment unit 520 (e.g., as depicted in FIGS. 5A and 5B).

In various embodiments, first visual output system 550-1 may be located on an outer surface of deployment end 514 between a bay of CEW 500 and front sight 507. For example, first visual output system 550-1 may be located on a front (or forward) surface of housing 510 (e.g., as depicted in FIGS. 5A and 5B). First visual output system 550-1 may be at least partially aligned with front sight 507. For example, first visual output system 550-1 (or a visual output from first visual output system 550-1) may be parallel to front sight 507. Second visual output system 550-2 may be located on an outer surface of deployment end 514 between a bay of CEW 500 and trigger 518. For example, second visual output system 550-2 may be located on a side surface of housing 510 (e.g., as depicted in FIGS. 5A and 5B).

Each visual output system 550-1, 550-2 may have any suitable orientation, size, and shape. Each visual output system 550-1, 550-2 may comprise one or more light emitting components. One or more visual output systems 350-1, 350-2, 350-3 may be configured to emit light as a colored light, based on a light emitting characteristic and/or an emitting pattern, or the like, as discussed previously herein.

In various embodiments, one or more first light emitting characteristics of a first visual output system may be different from one or more second light emitting characteristics of a second visual output system. The one or more first light emitting characteristics may include a first emitting angle that is broader than a second emitting angle of the one or more second light emitting characteristics. The one or more first light emitting characteristics may include a first emitting time that is earlier than a second emitting time of the one or more second light emitting characteristics, including for a same selection of a firing mode for CEW 500. The one or more first light emitting characteristics may include a first emitting color, a first emitting order, and/or a first emitting pattern that are respectively different from a second emitting color, a second emitting order, and/or a second emitting pattern of the one or more second light emitting characteristics, including for a same operation of safety switch 530. For example, visual output system 550-2 may comprise one or more light emitting diodes with a broad emitting angle, while visual output system 550-1 may comprise one or more laser light sources with a coherent, narrower emitting angle. Visual output system 550-1 may alternately or additionally have a later emitting time compared to visual output system 550-2, including for a same operation of safety switch 530. Light emitting components of visual output system 550-2 may output light sequentially, while light emitting components of visual output system 550-1 may output light at a same time in accordance with different emitting orders for visual output system 550-1 and visual output system 550-2. Other differences in one or more light emitting characteristics between different visual output systems may be provided as well in embodiments according to various aspects of the present disclosure.

As an example, and in accordance with various embodiments, first visual output system 550-1 may comprise one or more light emitting components. For example, first visual output system 550-1 may comprise a flashlight and/or a laser module. The flashlight may comprise a tactical flashlight, such as, for example, a high-lumen light emitting component. The flashlight may provide a visual output configured to illuminate an object or location. The flashlight may also provide a visual output configured to disorient a target (e.g., via a bright light). The laser module may be configured to aid a user in accurately aiming CEW 500 towards a target. For example, the laser module may comprise one or more laser outputs configured to at least partially visually depict the trajectory of one or projectiles.

As a further example, and in accordance with various embodiments, second visual output system 550-2 may comprise one or more light emitting components different from first visual output system 550-1. For example, second visual output system 550-2 may comprise a light bar having one or more light emitting diodes (LEDs). Second visual output system 550-2 may comprise a plurality of light bars, such as, for example one on either side of housing 510. The light bars may be configured to emit a different visual output than the visual output provided by the first visual output system 550-1. In that respect, the first visual output from first visual output system 550-1 may be different (e.g., a different visual output type) than the second visual output from second visual output system 550-2.

Audio output system 570 may be similar to, or have similar aspects and/or components with, any audio output system discussed herein. For example, audio output system 570 may be configured to generate and/or output an audio output (e.g., an audio warning, an audio output warning, etc.). The audio output may comprise sounds including speech, music, tones, prerecorded sounds, or any other type of audio output. Audio output system 570 may be configured to output the audio output from (or through) an exterior surface of the CEW, and/or at any other suitable location on or in CEW 500 whereby a potential target may perceive the audio output.

In various embodiments, audio output system 570 may be located on an outer surface of deployment end 514. For example, audio output system 570 may be located on an outer surface of deployment end 514 proximate a bay configured to receive deployment unit 520 (e.g., as depicted in FIGS. 5A and 5B). Audio output system 570 may comprise one or more components configured to generate and/or output audio such as, for example, audio generating components (e.g., discrete soundcards, integrated soundcards, processors, processing circuits, integrated circuits, amplifier, etc.), audio output components (e.g., speakers), and/or the like.

Audio output system 570 may be configured to output the audio output as a warning sound, a charging sound, a speech output, an animal deterrent output, or the like, as discussed previously herein. Audio output system 570 may be configured to output the audio output based on an audio output characteristic, as discussed previously herein.

In accordance with various embodiments, FIG. 5A depicts CEW 500 having safety switch 530 in a safety mode. In the safety mode, visual output systems 550-1, 550-2 and audio output system 570 are configured to not output a warning (e.g., a visual output and an audio output).

In accordance with various embodiments, FIG. 5B depicts CEW 500 having safety switch 530 in an active mode. In the active mode, visual output systems 550-1, 550-2 and audio output system 570 are configured to output a warning (e.g., a visual output and an audio output). For example, visual output systems 550-1, 550-2 and audio output system 570 may output the warning in response to safety switch 530 being in the active mode, for the entirety safety switch 530 is in the active mode, based on an output time (e.g., a visual output time and/or an audio output time), and/or the like.

In response to a user operating safety switch 530 from the safety mode into the active mode, a processing circuit of CEW 500 may detect (e.g., mechanically, electronically, electrically, etc.) that safety switch 530 is in the active mode. In response to detecting that safety switch 530 is in the active mode, the processing circuit may activate visual output systems 550-1, 550-2 and/or audio output system 570 to output a warning (e.g., a visual output and an audio output). The processing circuit may activate visual output systems 550-1, 550-2 and/or audio output system 570 using any suitable process.

As an example, and in accordance with various embodiments, in response to detecting that safety switch 530 is in the active mode the processing circuit may be configured to control and/or coordinate operation of some or all aspects of visual output systems 550-1, 550-2 and/or audio output system 570. The processing circuit may include (or be in communication with) memory (e.g., tangible non-transitory memory) configured to store instructions (e.g., warning instructions). The instructions may include data that, in response to being executed by the processing circuit, control operation and function of one or more visual output systems 550-1, 550-2 and/or audio output system 570. For example, the instructions may include one or more light emitting characteristics, audio output characteristics, output times (e.g., audio output times and/or visual output times), and/or the like. In that regard, in response to detecting that safety switch 530 is in the active mode, the processing circuit may execute the instructions stored in the memory. In response to executing the instructions, the processing circuit may communicate with and/or control one or more visual output systems 550-1, 550-2 and/or audio output system 570 to output the warning.

As a further example, and in accordance with various embodiments, in response to detecting that safety switch 530 is in the active mode the processing circuit may control an electrical switch to provide power to visual output systems 550-1, 550-2 and/or audio output system 570. The electrical switch may be located in an electrical circuit between one or more of visual output systems 550-1, 550-2 and/or audio output system 570, and a power supply in CEW 500. In response to the electrical circuit being completed, one or more of visual output systems 550-1, 550-2 and/or audio output system 570 may receive the power and may output the warning.

In response to a user operating safety switch 530 from the active mode into the safety mode (e.g., as depicted in FIG. 5A), the processing circuit of CEW 500 may deactivate, or cease instructing or controlling, visual output systems 550-1, 550-2 and/or audio output system 570 (e.g., to no longer output the warning).

In various embodiments, CEW 500 may also be configured to activate or change the output of visual output systems 550-1, 550-2 and/or audio output system 570 responsive to an intermediary event, such as, for example, in response to a trigger activation. Changing the output of one or more of visual output systems 550-1, 550-2 and/or audio output system 570 may include providing a second visual output and/or second audio output that is at least partially different from previously providing visual outputs or audio outputs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of controlling output of an audio output system of a conducted electrical weapon ("CEW"), the method comprising:

outputting, by the audio output system, a first audio output, wherein the first audio output is configured to provide a warning to a target;

determining an intermediary event of the CEW;

changing, in response to the determining the intermediary event, output from the audio output system; and outputting, by the audio output system and based on the intermediary event, a second audio output, wherein the second audio output is different from the first audio output.

2. The method of claim 1, wherein the outputting the second audio output is together with the outputting the first audio output.

3. The method of claim 1, wherein the outputting the second audio output is separate from the outputting the first audio output.

4. The method of claim 1, wherein the determining the intermediary event is based on a user input.

5. The method of claim 1, further comprising detecting a control event from a control interface of the CEW, wherein the outputting the first audio output is based on the control event.

6. The method of claim 5, wherein the determining the intermediary event is based on detecting a second control event from the control interface of the CEW.

7. The method of claim 5, wherein the determining the intermediary event is based on detecting an activation event from a trigger of the CEW.

8. The method of claim 1, further comprising retrieving an audio output characteristic from a memory of the CEW, wherein at least one of the first audio output or the second audio output is output based on the audio output characteristic.

9. The method of claim 1, wherein the second audio output comprises at least one of a tone, an age-based audio output, or an animal deterrent output.

10. A conducted electrical weapon ("CEW") comprising:

an audio output system;

a processing circuit in communication with the audio output system; and a tangible, non-transitory memory configured to communicate with the processing circuit, the tangible, non-transitory memory having instructions stored thereon that, in response to execution by the processing circuit, cause the processing circuit to cooperate with the audio output system to perform operations comprising:

outputting a first audio output from the audio output system, wherein the first audio output is configured to provide a warning to a target;

determining an intermediary event of the CEW;

changing, in response to the determining the intermediary event, output from the audio output system; and outputting, based on the intermediary event, a second audio output from the audio output system, wherein the second audio output is different from the first audio output.

11. The CEW of claim 10, wherein the operations further comprise:

retrieving an audio output characteristic; and outputting at least one of the first audio output or the second audio output based on the audio output characteristic.

12. The CEW of claim 11, wherein the audio output characteristic defines at least one of an output time, an output pattern, or an output intensity.

13. The CEW of claim 11, wherein the audio output characteristic defines a first audio output characteristic associated with the first audio output and a second audio output characteristic associated with the second audio output.

14. The CEW of claim 10, further comprising a visual output system in communication with the processing circuit, wherein the operations further comprise outputting a visual output from the visual output system.

15. The CEW of claim 14, wherein the visual output is output together with the first audio output.

16. The CEW of claim 14, wherein the visual output is output together with the first audio output and the second audio output.

17. The CEW of claim 14, wherein the visual output comprises a first visual output directed towards the target and a second visual output configured to provide the warning to the target.

18. A method of outputting audio from an audio output system of a conducted electrical weapon ("CEW"), the method comprising:

outputting, by the audio output system and based on a first event of the CEW, a first audio output;

changing, in response to an intermediary event of the CEW, output from the audio output system;

outputting, by the audio output system and based on the intermediary event of the CEW, a second audio output, wherein the second audio output is different from the first audio output;

changing, in response to a second event of the CEW, output from the audio output system; and outputting, by the audio output system and based on the second event of the CEW, a third audio output.

19. The method of claim 18, wherein at least one of the first event or the second event comprise a control event from a control interface of the CEW.

20. The method of claim 18, wherein the third audio output is different from the second audio output.

* * * * *